United States Patent
Patne

(10) Patent No.: US 11,995,663 B2
(45) Date of Patent: May 28, 2024

(54) AUTOMATIC DETECTION AND VALIDATION OF TRANSPORT SERVICE

(71) Applicant: TOYOTA MOTOR NORTH AMERICA, INC., Plano, TX (US)

(72) Inventor: Satyajit P. Patne, The Colony, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 180 days.

(21) Appl. No.: 17/072,245

(22) Filed: Oct. 16, 2020

(65) Prior Publication Data

US 2022/0122090 A1    Apr. 21, 2022

(51) Int. Cl.

| | |
|---|---|
| G06Q 30/00 | (2023.01) |
| G06Q 10/00 | (2023.01) |
| G06Q 10/10 | (2023.01) |
| G06Q 10/20 | (2023.01) |
| G06Q 20/08 | (2012.01) |
| G06Q 20/38 | (2012.01) |
| G06Q 30/018 | (2023.01) |
| G06Q 50/30 | (2012.01) |
| G06Q 50/40 | (2024.01) |
| G07C 5/00 | (2006.01) |
| H04L 9/06 | (2006.01) |

(52) U.S. Cl.
CPC ......... *G06Q 30/0185* (2013.01); *G06Q 10/10* (2013.01); *G06Q 10/20* (2013.01); *G06Q 20/085* (2013.01); *G06Q 20/389* (2013.01); *G06Q 50/40* (2024.01); *G07C 5/008* (2013.01); *H04L 9/0637* (2013.01)

(58) Field of Classification Search
CPC .................................................. G06Q 30/0185
See application file for complete search history.

(56) References Cited

U.S. PATENT DOCUMENTS

| | | |
|---|---|---|
| 6,920,382 B2 | 7/2005 | Katagishi et al. |
| 7,519,458 B2 | 4/2009 | Buckley |
| 7,921,041 B1 | 4/2011 | Wolery et al. |

(Continued)

FOREIGN PATENT DOCUMENTS

| | | |
|---|---|---|
| CN | 101960497 B | 9/2015 |
| CN | 104601327 B | 1/2019 |

(Continued)

OTHER PUBLICATIONS

Kim, et al., in Localization of a car based on multi-sensor fusion, in The International Archives of the Photogrammetry, Remote Sensing and Spatial Information Sciences, vol. XLII-1 (Year: 2018).*

*Primary Examiner* — Olabode Akintola
*Assistant Examiner* — Brandon M Duck

(57) ABSTRACT

An example operation includes one or more of performing, by a transport, validation of a service that is utilized at a first time, in response to the validation at the first time, transferring, by the transport, a portion of a value related to the service, performing, by the transport, at least one other validation of the service that is utilized at a second time, wherein the second time is later than the first time, and in response to the at least one other validation at the second time, transferring, by the transport, a second portion of the value related to the service.

20 Claims, 20 Drawing Sheets

(56) References Cited

U.S. PATENT DOCUMENTS

| | | |
|---|---|---|
| 8,275,130 B2 | 9/2012 | Kawamura et al. |
| 8,526,606 B2 | 9/2013 | Muthaiah |
| 8,589,696 B2 | 11/2013 | Atherton |
| 8,798,852 B1 | 8/2014 | Chen et al. |
| 9,014,888 B2 | 4/2015 | Sukkarié et al. |
| 9,020,697 B2 | 4/2015 | Ricci et al. |
| 9,189,900 B1 | 11/2015 | Penilla et al. |
| 9,240,018 B2 | 1/2016 | Ricci |
| 9,428,127 B2 | 8/2016 | Cooper et al. |
| 9,734,532 B1 | 8/2017 | Brandmaier et al. |
| 9,783,162 B2 | 10/2017 | Hoyos et al. |
| 9,805,519 B2 | 10/2017 | Ramanujam |
| 9,849,364 B2 | 12/2017 | Tran et al. |
| 10,106,141 B2 | 10/2018 | Heil et al. |
| 10,249,123 B2 | 4/2019 | Hatton |
| 10,286,919 B2 | 5/2019 | Penilla et al. |
| 10,493,953 B2 | 12/2019 | Arakawa et al. |
| 10,604,115 B2 | 3/2020 | Ahmad |
| 2009/0234480 A1 | 9/2009 | Marion |
| 2011/0289123 A1 | 11/2011 | Denison |
| 2012/0253607 A1 | 10/2012 | Choi |
| 2015/0221048 A1* | 8/2015 | Zenhausern |
| 2015/0239357 A1 | 8/2015 | Huntzicker et al. |
| 2016/0267451 A1 | 9/2016 | Eid |
| 2017/0148102 A1 | 5/2017 | Franke et al. |
| 2018/0018723 A1 | 1/2018 | Nagla et al. |
| 2018/0105137 A1 | 4/2018 | Kawamura et al. |
| 2018/0136655 A1 | 5/2018 | Kim et al. |
| 2018/0356821 A1 | 12/2018 | Kentley-Klay et al. |
| 2020/0223396 A1* | 7/2020 | Yi ............................ B60R 25/25 |
| 2022/0052997 A1 | 2/2022 | Kim et al. |
| 2022/0108244 A1* | 4/2022 | Subramanian ......... G06Q 10/06 |
| 2022/0113146 A1* | 4/2022 | Colon |
| 2022/0123923 A1 | 4/2022 | Patne et al. |
| 2023/0278426 A1 | 9/2023 | Tsuda et al. |
| 2023/0281290 A1 | 9/2023 | Mahaffey et al. |

FOREIGN PATENT DOCUMENTS

| | | | | |
|---|---|---|---|---|
| DK | 102018212877 | * | 2/2020 | ............ B60N 2/002 |
| IN | 105083214 B | | 9/2018 | |
| KR | 20170028357 A | | 3/2017 | |

* cited by examiner

AUTOMATIC DETECTION AND VALIDATION OF TRANSPORT SERVICE

BACKGROUND

Vehicles or transports, such as cars, motorcycles, trucks, planes, trains, etc., generally provide transportation needs to occupants and/or goods in a variety of ways. Functions related to transports may be identified and utilized by various computing devices, such as a smartphone or a computer located on and/or off the transport.

SUMMARY

One example embodiment provides a method that includes one or more of detecting, via a transport, a service has been performed to the transport, identifying, via validation logic executing on the transport, one or more operating parameters of the transport, determining, via the validation logic, whether the service has been successfully performed based on the one or more operating parameters of the transport, and in response to the determining the service has been successfully performed, transferring, via the transport, a value to a remote computing system associated with the service.

Another example embodiment provides a transport that includes a processor that is configured to one or more of detect a service has been performed to the transport, identify, via validation logic on the transport, one or more operating parameters of the transport, determine, via the validation logic, whether the service has been successfully performed based on the one or more operating parameters of the transport, and in response to the determination that the service has been successfully performed, transfer a value to a remote computing system associated with the service.

A further example embodiment provides a non-transitory computer readable medium comprising instructions, that when read by a processor, cause the processor to perform one or more of detecting, via a transport, a service has been performed to the transport, identifying, via validation logic executing on the transport, one or more operating parameters of the transport, determining, via the validation logic, whether the service has been successfully performed based on the one or more operating parameters of the transport, and in response to the determining the service has been successfully performed, transferring, via the transport, a value to a remote computing system associated with the service.

DETAILED DESCRIPTION

Figure 1A:
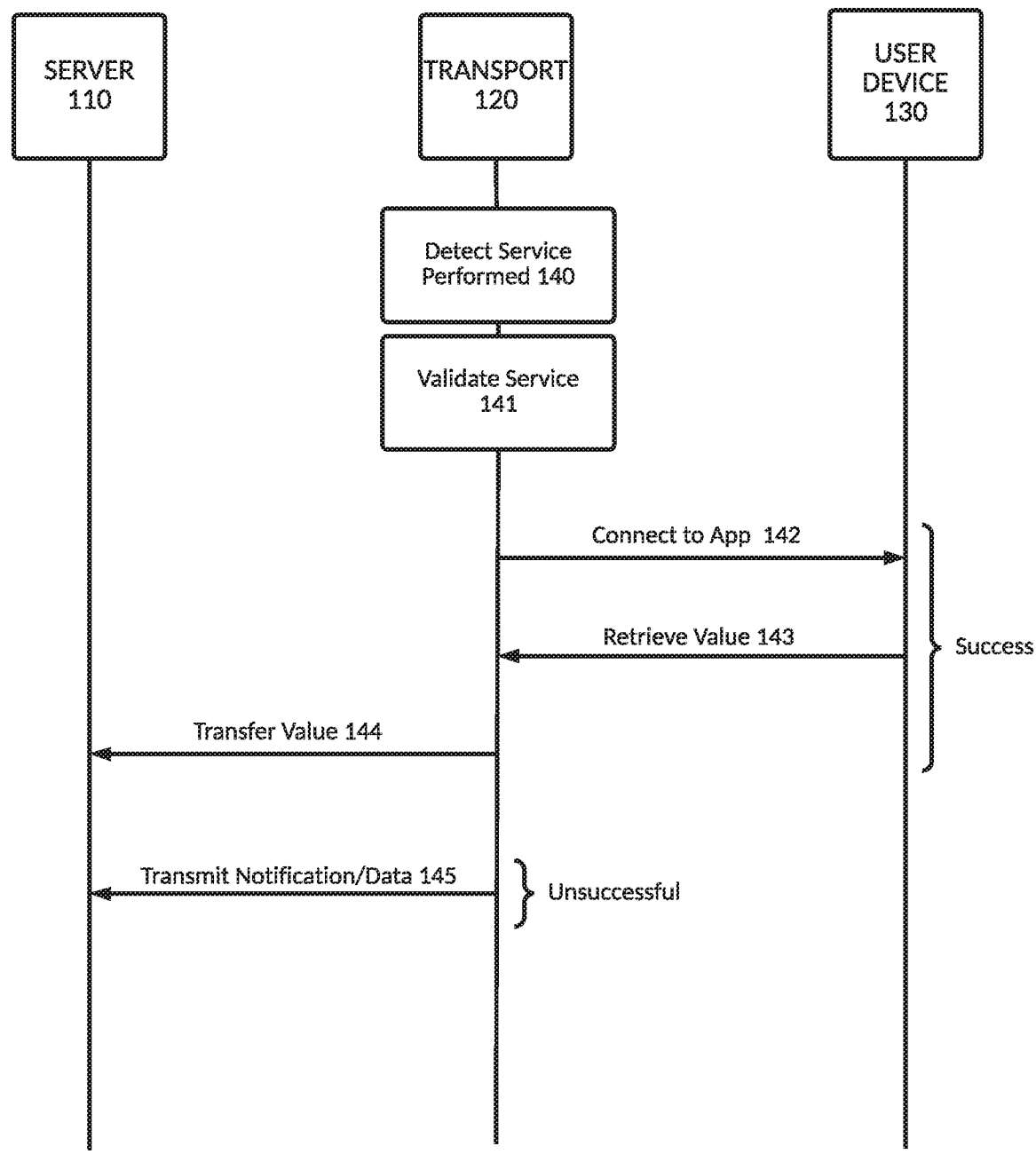
FIG. 1A is a diagram illustrating a communication sequence for validating a service performed to a transport, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

Communications between the transport(s) and certain entities, such as remote servers, other transports and local computing devices (e.g., smartphones, personal computers, transport-embedded computers, etc.) may be received and processed by one or more 'components' which may be hardware, firmware, software or a combination thereof. The components may be part of any of these entities or computing devices or certain other computing devices. In one example, consensus decisions related to blockchain transactions may be performed by computing devices or components associated with the transport(s) and one or more of the components outside or at a remote location from the transport(s)

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current solution, a transport may include one or more of cars, trucks, walking area battery electric vehicle (BEV), e-Palette, fuel cell bus, motorcycles, scooters, bicycles, boats, recreational vehicles, planes, and any object that may be used to transport people and or goods from one location to another.

In addition, while the term "message" may have been used in the description of embodiments, other types of network data, such as, a packet, frame, datagram, etc. may also be used. Furthermore, while certain types of messages and signaling may be depicted in exemplary embodiments they are not limited to a certain type of message and signaling.

Example embodiments provide methods, systems, components, non-transitory computer readable media, devices, transports, and/or networks, which provide for validation of a service performed to a transport. For example, a transport's computer may detect when a new service has been performed to the transport (e.g., oil change, tire rotation, alignment, engine check, brake check, etc.) via one or more indicators. The transport's computer may further receive data from one or more sensors that monitor operating conditions of the transport. Here, the transport's computer may be embedded with validation logic, a smart contract, a combination thereof, and the like, which can be used to validate operating conditions of the transport with respect to predetermined constraints of the service to determine whether the service has been successfully performed. For example, sensor data associated with steering and tire pressure can be used to validate a tire rotation service, alignment, etc., was performed correctly.

Various embodiments may include at least one of: a transport (also referred to as a vehicle or car herein), a data collection system, a data monitoring system, a validation system, an authorization system and a vehicle data distribution system. Vehicle status data may be received in the form of communication messages, such as wireless data network communications and/or wired communication messages, may be processed to identify vehicle/transport status conditions and provide feedback as to the condition and/or changes of a transport. In one example, a user profile may be applied to a particular transport/vehicle to authorize a current vehicle event, service stops at service stations, to authorize subsequent vehicle rental services, and enable vehicle to vehicle communications.

Within the communication infrastructure, a decentralized database is a distributed storage system, which includes multiple nodes that communicate with each other. A blockchain is an example of a decentralized database, which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permissionless blockchain, anyone can participate without a specific identity. Public blockchains can involve crypto-currencies and use consensus based on various protocols such as proof of work (PoW). Conversely, a permissioned blockchain database can secure interactions among a group of entities, which share a common goal, but which do not or cannot fully trust one another, such as businesses that exchange funds, goods, information, and the like. The instant solution can function in a permissioned and/or a permissionless blockchain setting.

Smart contracts are trusted distributed applications, which leverage tamper-proof properties of the shared or distributed ledger (which may be in the form of a blockchain) and an underlying agreement between member nodes, which is referred to as an endorsement or endorsement policy. In general, blockchain entries are "endorsed" before being committed to the blockchain while entries, which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node, which submits an entry-invocation to an endorser (e.g., peer), and broadcasts entry-proposals to an ordering service (e.g., ordering node). Another type of node is a peer node, which can receive client submitted entries, commit the entries and maintain a state and a copy of the ledger of blockchain entries. Peers can also have the role of an endorser. An ordering-service-node or orderer is a node running the communication service for all nodes, and which implements a delivery guarantee, such as a broadcast to each of the peer nodes in the system when committing entries and modifying a world state of the blockchain. The world state can constitute the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain), which is used to store an immutable, sequenced record in blocks. The ledger also includes a state database, which maintains a current state of the blockchain. There is typically one ledger per channel. Each peer node maintains a copy of the ledger for each channel of which they are a member.

A chain is an entry log structured as hash-linked blocks, and each block contains a sequence of N entries where N is equal to or greater than one. The block header includes a hash of the blocks' entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Since the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log and can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments may also be associated with a service to a particular vehicle and/or a user profile that is applied to the vehicle. For example, a user may be the owner of a vehicle or the operator of a vehicle owned by another party. The vehicle may require service at certain intervals and the service needs may require authorization prior to permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more vehicle and/or road sensors or cameras, which report sensed data to a central controller computer device in and/or apart from the vehicle. This data is forwarded to a management server for review and action. A sensor may be located on one or more of the interior of the transport, the exterior of the transport, on a fixed object apart from the transport, and on another transport proximate the transport. The sensor may also be associated with the transport's speed, the transport's braking, the transport's acceleration, fuel levels, service needs, the gear-shifting of the transport, the transport's steering, and the like. A sensor, as described herein, may also be a device, such as a wireless device in and/or proximate to the transport. Also, sensor information may be used to identify whether the vehicle is operating safely and whether an occupant has engaged in any unexpected vehicle conditions, such as during a vehicle access and/or utilization period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., owner, user, company, agency, etc.) may want to limit the exposure of private information, and therefore the blockchain and its immutability can be used to manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a consensus approach associated with the blockchain. Such an approach could not be implemented on a traditional centralized database.

Various driving systems of the instant solution can utilize software, an array of sensors as well as machine learning functionality, light detection and ranging (LIDAR) projectors, radar, ultrasonic sensors, etc. to create a map of terrain and road that a transport can use for navigation and other purposes. In some embodiments, GPS, maps, cameras, sensors and the like can also be used in autonomous vehicles in place of LIDAR.

Data shared and received as described herein may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record. A blockchain may be used for storing transport-related data and transactions.

According to various embodiments, a transport (e.g., logic running on a computing system of the transport, etc.) is configured to determine if an action performed to the transport (e.g., a service, a repair, etc.) was properly performed. For example, after a steering/tire alignment is completed, the transport validates the alignment based on sensor data to ensure it was performed correctly. Over a period of time, alignment may continuously be validated until a predetermined distance has been traveled, time has elapsed, etc. If a problem is detected, an identification of the problem may be sent to an entity associated with the service (e.g., a dealership, a service shop, another business, another individual, etc.) so that the entity can be prepared to correct the issue. A payment may be withheld by the transport until the transport validates the service is performed correctly, or any changes are performed correctly. Then, the remaining payment or entire payment is made for the service, repair, etc.

A transport (e.g., vehicle, etc.) validates that a service has been performed correctly. For example, the validation may be bifurcated into at least two separate validation steps. As one non-limiting example, a transport may have a part or item that is repaired, replaced, installed, etc. In this example, the transport may verify that a part or item is added to the transport during the first validation and verify that the transport is operating correctly with the part during the second validation. Here, a computer of the transport may communicate directly with a remote server of the entity performing the service. As another example, the transport may include a display console which displays warnings to the user and requests the user to send a communication (e.g., press a button on the console, etc.) to notify the remote server of the entity that the validation of the service has been successful or unsuccessful.

As a non-limiting example, a service performed by a dealership, a shop, etc., may add new tires to a vehicle. During a first validation, the vehicle may determine that the new tires have been added. The first validation may occur in response to the vehicle being powered on for the first time. For example, the diagnostics on the vehicle may identify that the vehicle has new tires. Meanwhile, a second validation may be performed to ensure that an alignment of the vehicle (including the new tires) is correct. Here, the second validation may be performed at a second time that is after the first time. For example, the second validation may occur after the vehicle has travelled a predetermined distance down the road or after a predetermined amount of time has elapsed (for example, with the motor running). The first and/or second validation may be based on sensor readings of the alignment performed by one or more sensors on the vehicle. In this way, the entity performing the service will not receive a full value until the service has been validated by the transport.

The transport (e.g., a computer of the transport) may communicate with a remote server of an entity providing the service and/or with a server configured to communicate with the transport and the entity. According to various embodiments, the transport and/or the server may transfer a partial value for the service to the entity after the first validation is performed. For example, the partial value may be a monetary value, a virtual item (e.g., digital currency, etc.), a credit, an escrow, and the like. In addition, the transport may reserve some of the value for the service (i.e., refrain from transferring to the entity) until the second validation is performed. For example, the transport may transfer the remaining value to the entity after the second validation has been successful. If the validation is not successful, the transport may communicate with the remote server of the entity to provide notice of the remaining issues. If the validations are successful, the transport may communicate with the remote server of the entity to provide notification that the partial value has been transferred at the first time and that the remaining value has been transferred at the second time. The transport may dynamically communicate with the remote server and/or the server via one or more sensors and/or processors/computers within the transport (i.e. without human interaction).

Some of the benefits provided by the example embodiments include a transport validating a service, and reserving providing full consideration for the service until full validation has occurred. The validation process may be bifurcated which enables both the identification of a service being performed and a validation of a performance of the transport after the service has been performed. The validation process may take place without the user's knowledge in that the user may be unaware of the validations being performed by the transport and/or a partial consideration and/or a full consideration not being provided. As another option, the transport may notify the user of any issues via a center console or other display within the transport. Furthermore, the transport may automatically communicate with a remote server of the entity that provided the service to provide validation results, requests for additional service, and the like.

FIG. 1A illustrates a communication sequence 100 for validating a service performed to a transport, according to example embodiments. Referring to FIG. 1A, a transport 120 (e.g., a computer installed within the transport 120, etc.) may establish a connection with a server 110 (e.g., a web server, a cloud platform, a database, etc.) and a user device 130, via one or more networks. As some non-limiting examples, the transport 120 may be a vehicle, an aircraft, a boat, a train, and the like. The transport 120 may include one or more network interfaces that connect to the transport via Bluetooth, Internet, cellular, WAN, LAN, etc. As one example, the transport 120 may connect to the server 110 via a first network such as a wireless network (e.g., LAN, etc.). As another non-limiting example, the transport 120 may also establish a connection with the user device 130 via a second network (e.g., Bluetooth, wired, etc.). Here, the user device 130 may be a device of an occupant of the transport 120.

In this example, the server 110 may be associated with the transport 120, for example, a host server of applications and/or services running on a computer of the transport 120. In some embodiments, the server 110 may be a cloud platform that performs Vehicle to Cloud (V2C) communications to exchange information for applications running on the transport 120 and hosted by the server 110. Also, the transport 120 may connect the user device 130 to the server 110, for additional communications.

Here, the transport 120 may trigger or otherwise invoke a payment process via the server 110. In some embodiments, the payment process may be triggered by the server 110 directly, or by one or more other nodes or servers that are external to the server 110. For example, when a service to the transport is performed such as tire rotation, oil change, engine check, coolant check, repairs, brake service, battery replacement, fluid change, filter change, suspension service, and the like, a payment process may be initiated by the transport 120 via the server 110. Although not shown in FIG. 1A, it should be appreciated that one or more intermediate servers or nodes may be positioned between the transport 120 and the server 110. For example, the transport 120 may be in communication with another server (not shown), which then communicates with the server 110 of the service provider. Payment of a fee for the service (or part of the fee) may be contingent upon successful completion of the service. For example, payment for the service may include in two or more stages, where an initial partial payment is made at the time of service and the remaining payment is made only after the transport 120 validates the service performance.

The communication sequence 100 may begin when the transport 120 is powered on after a service procedure (i.e., physical service applied to the transport 120) has been performed, and the like. In 140, the transport 120 may detect that the service has been performed. For example, the transport 120 may detect the reset of a warning message (e.g., check engine, maintenance, etc.). As another example, the transport 120 may detect a change in fluid levels via one or more sensor devices. As another example, the transport 120 may detect that a new filter, a new brake pad, a new tire, or the like, has been added to the transport 120 via one or more sensing device, or the like. As another example, the transport 120 may provide a user interface to an occupant of the transport 120 that can input a command into the user interface to identify a new service that has been performed.

In 141, the transport may attempt to validate whether the service has been successfully performed. For example, the transport 120 may determine whether operating parameters measured by sensors that capture various data from the operation of the transport 120 satisfy one or more constraints that are predefined and which represent a successful service performance. As an example, the constraints may include predetermined values for fluid levels, brake levels, oxygen emissions, battery power levels, alignment values, temperature values, and the like. The transport 120 may trigger one or more sensors thereof to measure any of these levels as the operating parameters and determine whether the measured levels meet or exceed the predetermined constraints necessary for a successful service performance.

If the measured operating parameters satisfy the predetermined constraints in 141, the transport 120 may determine that the service has been successfully performed. Accordingly, in 142 the transport 120 may connect to the user device 130 (e.g., a payment application on the user device 130, etc.) and retrieve a payment from the user device 130 (e.g., via a payment application, etc.) in 143. Furthermore, in 144, the transport 120 may invoke the payment to a service provider via a transfer or other communication to the server 110. Here, the server 110 may receive the payment information and initiate a payment process based on instructions from the transport 120, including any payment information retrieved from the user device 130. As an example, a payment wallet stored on the user device 130 may be used to pay for the service via the transport 120 and the server 110. Here, the transport 120 may receive the payment information/value from the payment application on the user device 130 via the connection with the user device 130, and transmit the payment/value to the server 110 via the connection with the server 110. As another example, the transport 120 may establish a connection with another server (associated with the transport 120) which then initiates the payment with the server 110 of the service provider. In some examples, the transport 120 may be simultaneously connected to the user device 130 and the server 110, via different networks.

As another example, if the measured parameters do not satisfy the predetermined constraints, the transport 120 may skip steps 142, 143, and 144, and instead send a notification to the server 110 (or another device not shown) indicating that the service was not successful, in 145. In this example, the transport 120 may also transmit any information that is sensed by the sensors to inform the server 110 to forward to the service provider that can provide a description of the issues/deficiencies of the service performed. For example, sensor readings that violate the predetermined constraints of a contract/agreement for the service may be provided. Thus, the service provider can prepare to correct any issues of the service.

In some embodiments, the transport's computer may perform an auto diagnosis of a service performance, and send relevant data to a shop or establishment, to make the corrections when a service is not correctly performed. Also, partial payment may be provided initially (at the time of service), and final payment may be triggered automatically by the transport after validating the service has been performed correctly. In some embodiments, the validating may be continuously performed and reported for a predetermined period of time (e.g., until a predetermined distance has been travelled or a predetermined amount of time has elapsed on a system clock, etc. In some embodiments, the ter 'continuously' can mean repeatedly and/or intermittently.

In some embodiments, the transport 120 may determine whether the service is successful at the location of the service (i.e., before the transport 120 leaves the service provider's establishment). For example, the transport 120 may validate an oil has been changed while the geo-location of the transport 120 is at an establishment that performed the oil change. In this case, the transport 120 automatically executes the payment to the establishment for the cost of the oil change while on the premises. In some embodiments, the transport 120 may automatically apply any available coupons/discounts before completing the transaction.

In some embodiments, the transport 120 may include a smart contract that is used to invoke and record the transaction. In some embodiments, software on the transport 120 may continually provide one or more of acknowledgement, validation, payment upon validation, and the like. For example, an entire payment for an oil change can be made without the transport 120 needing to be driven. However, only a portion of a payment can be made for an alignment and/or tire rotation until the transport is driven. In this example, the remaining payment may not be provided until the software verifies the alignment is complete/correct.

Logic in the form of software embedded within and running on a memory of the vehicle may establish a connection to the server 110 to update the service provider with the results of the validation automatically. Furthermore, the logic can change parameters based on a contract. The logic may also include the ability to disable or change terms/conditions of the transaction on the transport 120. Thus, the transport 120 can take action or snake alterations (changes of terms/removals of terms) automatically. Furthermore, although not shown in FIG. 1A, the results of the validation may be provided to the user device 130, as well as the server 110, regardless of whether the validation is a successful or unsuccessful. Thus, both the service provider and the user may receive real-time results, automatically.

In one embodiment, the transport 120 may invoke/trigger a payment to an account associated with the establishment (such as a dealership, a service shop, another business, another individual, etc.) when entering or exiting the establishment. In another embodiment, the transport 120 may invoke/trigger a payment after the transport 120 departs the establishment and is driven for a period of time. The validation performed by the transport 120 may include verifying different actions which may take place over different periods of time, and different driving/road/weather conditions. These different periods of time and conditions may be dynamically set by the transport 120 and/or a server communicably coupled to the transport 120. Furthermore, a user may receive indication of the different actions that were taken. At that juncture, the transport 120 transfer a value to the establishment per verified action. The establishment and/or the occupant(s) of the transport 120 may be relieved from responsibility and determining whether or not a condition exists (for example, was an action performed incorrectly and/or did an unexpected result arise). Rather, the transport 120 can automatically, determine whether such performance was successful based on physical parameters (operating conditions) of the transport 120 which are read/measured by one or more sensors and/or software sensors of the transport 120.

In one embodiment, the transport 120 may pay for service the instant the service is complete. In this example, the service may be verified when service is completed such as an oil change, rotation, alignment, brake check, engine light, etc. As each service is performed, the transport 120 may verify the service has been completed and correctly performed. If an issue is identified by the transport 120, the transport 120 may report the issue. If no issue, auto payment is performed. Sensors can have an additional code to validate constraints and operating parameters associated with a successful service. In one embodiment, sensors may validate the action that was taken. For example, sensor data associated with steering can be utilized to validate the tire rotation/alignment as done correctly.

In some embodiments, multiple levels of validation can be performed for a single action. For example, a first level of testing may be performed at the establishment that performed the action while the transport 120 is parked/braked. Further, a second level of testing may be performed for the action once the vehicle is on the road (e.g., in motion, etc.) Here, the second level of testing can be performed regardless of whether the first level passes and/or fails. For example, if the first level passes validation, the second or further level may still need to be verified based on conditions such as a degree that the first level passed (e.g., did the first level barely pass or comfortably pass, that is, was it barely over an acceptable threshold or comfortably over the acceptable threshold), a type of action that was performed (e.g., was the service action related to a critical function, such as braking, security, etc.). This second level of testing may occur no matter how much the first level was comfortably over the acceptable threshold.

As another example, if the first level fails, the second or further level may still be verified to determine, for example, a degree that the first level failed (e.g., how far below the acceptable threshold) and based on how far below the threshold, a type of verification (e.g., the same verification that was performed during the first level can again be performed during the second level or a different verification can be performed based on how far below the threshold the failure occurred). Other additional validations include a number of times the second level of testing will be executed based on the type of action that was performed (e.g., was the action related to a critical function or a non-critical function). If related to a critical function, the second level of testing may be executed numerous times and in numerous conditions. In some cases though, if the first level fails, the second or further level may not need to be verified based on a degree that the first level failed, a type of action that as performed (e.g., was the action related to a non-critical function, such as enhanced volume control, etc.), and the like.

In some embodiments, the transport 120 may also have the ability to connect to pre-made monetary account (e.g., APPLE PAY®, GOOGLE PAY®, VENMO®, a checking account, etc.) in order to relay portion of the value and/or the whole value before and/or after service. Here, the transport 120 can relay information to the server 110 (or an intermediate server/cloud) to set up payment for designated store at any location.

Based on environmental conditions, internal conditions, other drivers, etc., the transport 120 may perform calculated recommendations to the driver and/or occupant(s) for safety as a service. For example, the transport 120 may calculate the route to a destination. If the transport 120 detects that a service has just been purchased, the transport 120 may provide more safety calculations and recommendations (e.g., safest route to take, when to stop for rest and fuel, etc.) in order to give the occupant(s) the safest possible experience. The notifications provided may include anything related to internal or external conditions (e.g., providing audio, video, and/or text warnings, automatically turning music volume down in traffic or harsh weather conditions, giving alerts for other transports, etc.) when a potentially adverse condition is about to occur. In one embodiment, the transport 120 may provide the notifications based on location, driving conditions, environmental conditions, etc., in order to provide the most accurate data to avoid an adverse outcome such as an accident.

Figure 1B:
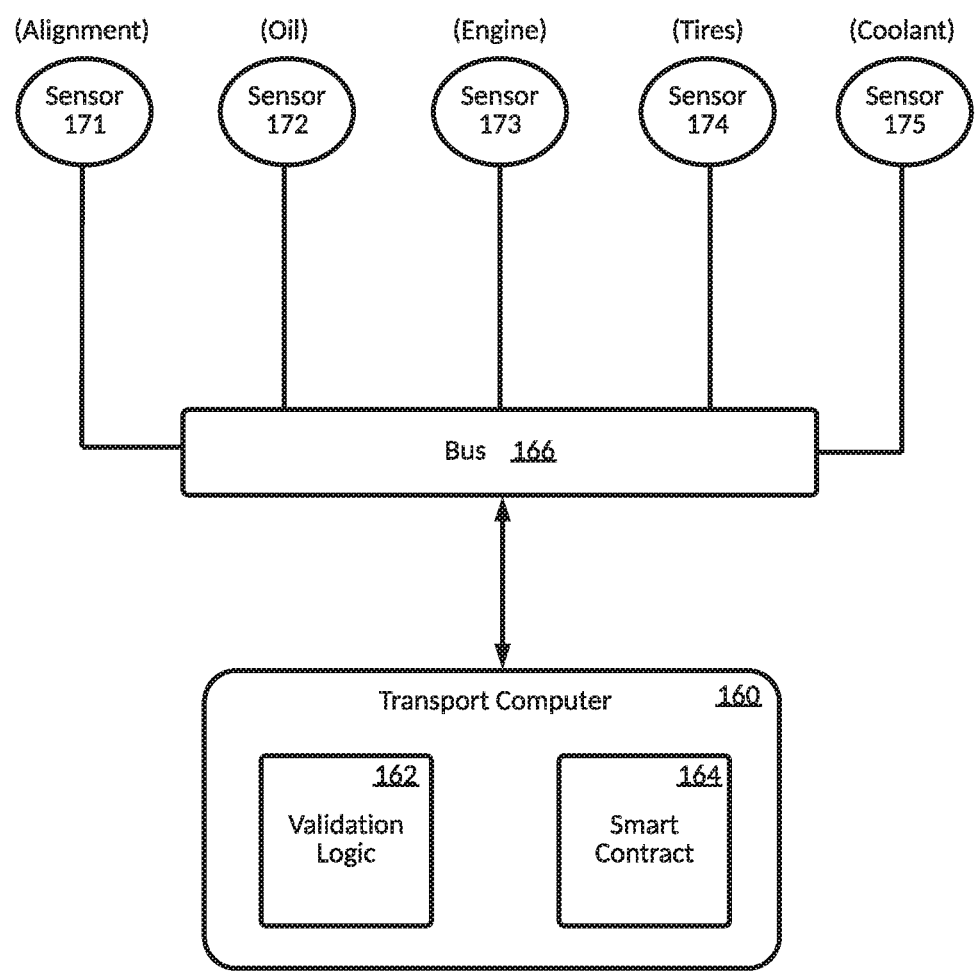
FIG. 1B is a diagram illustrating a communication architecture between validation logic and sensing devices of a transport, according to example embodiments.

FIG. 1B illustrates a communication architecture 150 of a transport which includes validation logic 162 and sensing devices 171-175, according to example embodiments. In this example, a plurality of sensors 171-175 are disposed within the transport and include hardware and logic for sensing operating conditions of the transport. The plurality of sensors 171-175 are connected to a transport computer 160 via a system bus 166 such as a CAN bus. The transport computer 160 includes a memory and a processor (not shown) which store and execute validation logic 162 for validating a service has been performed correctly, and a smart contract 164 which may store constraints (e.g., predetermined sensor values) which must be obtained to satisfy a successful service performance. In some embodiments, the validation logic 162 and the smart contract 164 may be one software, but are shown separately for convenience.

The smart contract 164 may be received from a remote server (e.g., server 110 in FIG. 1A) and may include identifiers of services, and constraints of each of the services that must be verified. The validation logic 162 may receive sensor readings from the plurality of sensors 171-175 and compare the sensor readings to the constraints within the smart contract 164 to determine whether a service has been successfully performed.

The transport 120 may register for the service verification logic with the remote server 110. For example, the transport 120 may download and/or receive constraints for validating the successful performance of a service from the server 110 and store the constraints in the smart contract 164. As an example, the constraints may include sensor readings that must be detected (e.g., at least a predetermined value) a number of times the value must be detected, a distance traveled, a speed achieved, etc. of the transport 120 that must also be obtained in association with the sensor readings. In some cases, the constraints may specify that the sensor readings must be obtained while the transport is in motion. Other constraints may specify that the sensor readings may be obtained while the transport s stationary (e.g., the transport has not left the service establishment, etc.). The transport 120 may store constraints for multiple different services that require different sensor readings and values in the smart contract 164. For example, constraints for a successful brake service may require a new brake pad part to be detected and a predetermined brake pressure to be sensed by a hardware sensor. As another example, a successful oil change service may require a predetermined level of oil in the tank, and a quality of the oil to be above a predetermined quality as sensed by a sensor of the oil tank. As another example, constraints may also include a "reset" of certain conditions to be performed by the service technician. This reset may indicate to the validation logic that a new service has been performed.

When the transport is powered on, the plurality of sensors 171-175 may begin capturing sensor readings of different fluids, parts, emissions, oxygen levels, coolant, tire pressure, brakes, etc., and feed the captured sensor readings to the validation logic 162. Although not shown, the validation logic 162 may also be connected to the transport's speedometer to identify whether the transport is in motion or stationary. The validation logic 162 may detect that a service has been performed to the transport based on one or more of the sensor readings, a user input, a "reset" of a check engine light, a maintenance light, etc., and the like. The validation logic 162 may then retrieve the constraints associated with the service from the smart contract 164, and verify that the constraints have been satisfied based on the sensor readings from one or more of the plurality of sensors 171-175. The validation logic 162 may, also require the transport to be in motion or stationary, depending on the constraints. If a successful service is detected, the validation logic 162 may trigger a payment, as described above with respect to FIG. 1A.

Over time, new constraints and services may be downloaded/imported into the transport's computer from the server 110. The new constraints may include new services or updates to existing services such as changes in operating parameters, newly added parameters, and the like. The transport may automatically receive the updates, for example, based on the registration of the transport with the server 110.

Figure 2A:
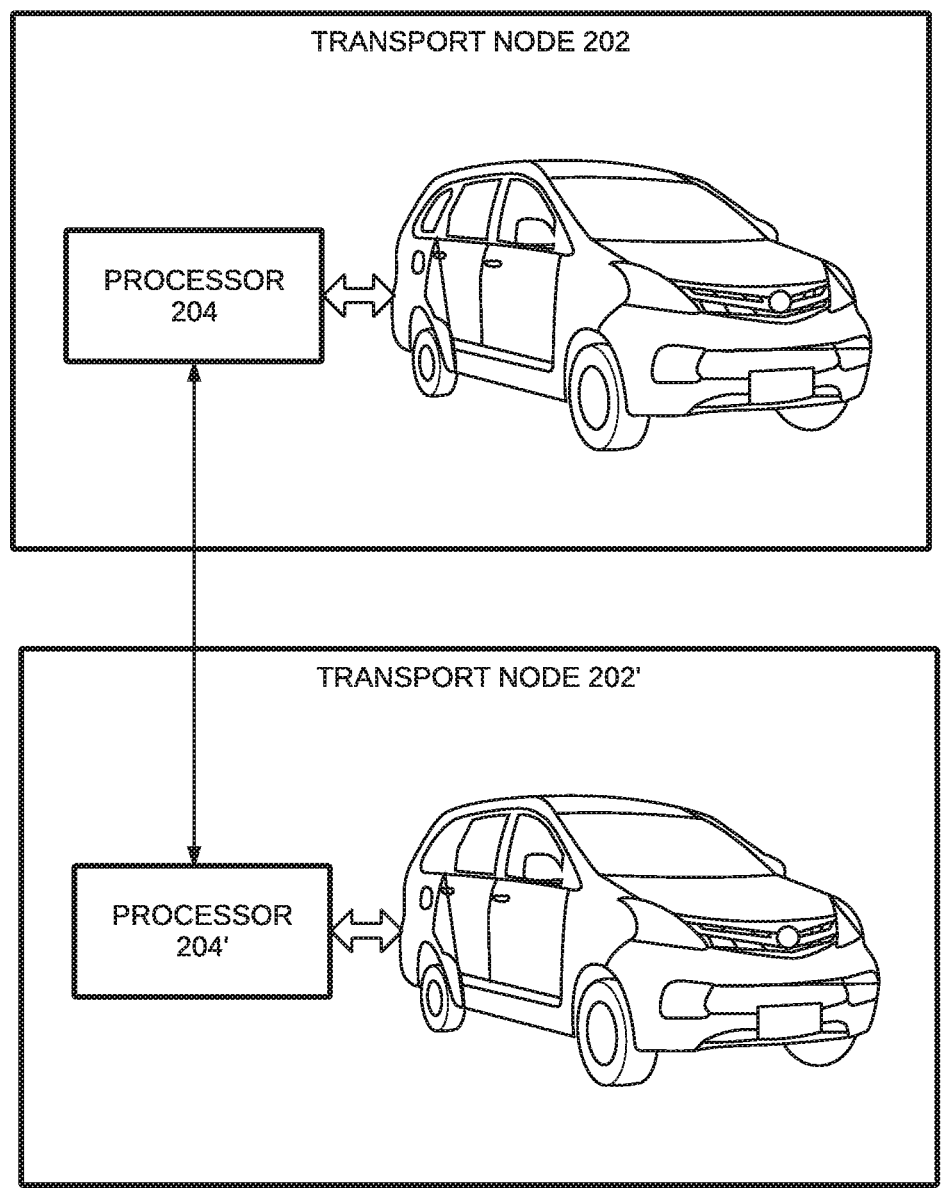
FIG. 2A is a diagram illustrating a transport network diagram, according to example embodiments.

FIG. 2A illustrates a transport network diagram 200, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. Although depicted as single transport nodes and processors, a plurality of transport nodes and processors may be present. One or more of the applications, features, steps, solutions, etc., described and/or depicted herein may be utilized and/or provided by the instant elements.

Figure 2B:
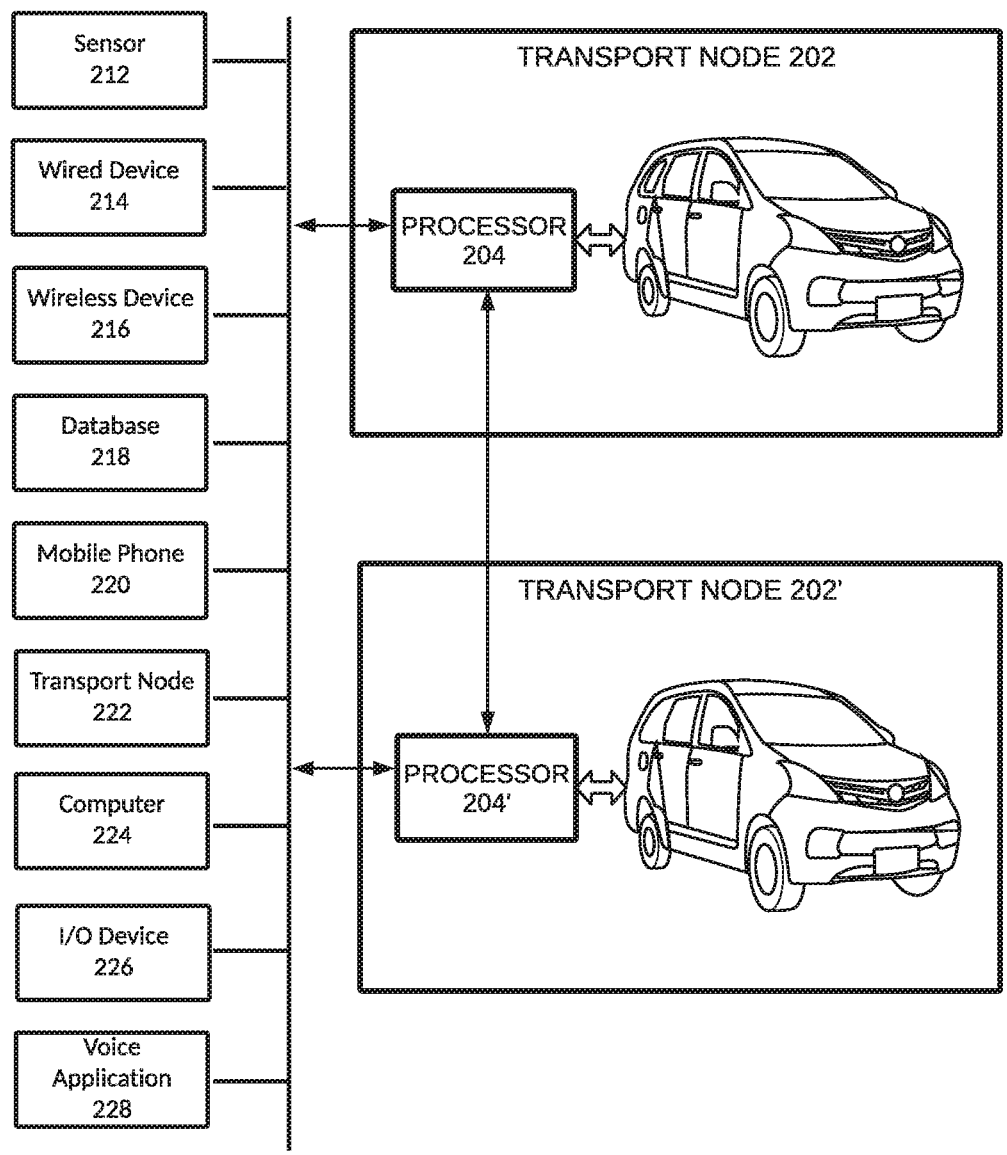
FIG. 2B is a diagram illustrating another transport network diagram, according to example embodiments.

FIG. 2B illustrates another transport network diagram 210, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. The processors 204, 204' can further communicate with one or more elements 230 including sensor 212, wired device 214, wireless device 216, database 218, mobile phone 220, transport node 222, computer 224, I/O device 226 and voice application 228. The processors 204, 204' can further communicate with elements comprising one or more of a processor, memory, and software.

Although depicted as single transport nodes, processors and elements, a plurality of transport nodes, processors and elements may be present. Information or communication can occur to and/or from any of the processors 204, 204' and elements 230. For example, the mobile phone 220 may provide information to the processor 204, which may initiate the transport node 202 to take an action, may further provide the information or additional information to the processor 204', which may initiate the transport node 202' to take an action, may further provide the information or additional information to the mobile phone 220, the transport node 222, and/or the computer 224. One or more of the applications, features, steps, solutions, etc., described and/or depicted herein may be utilized and/or provided by the instant elements.

Figure 2C:
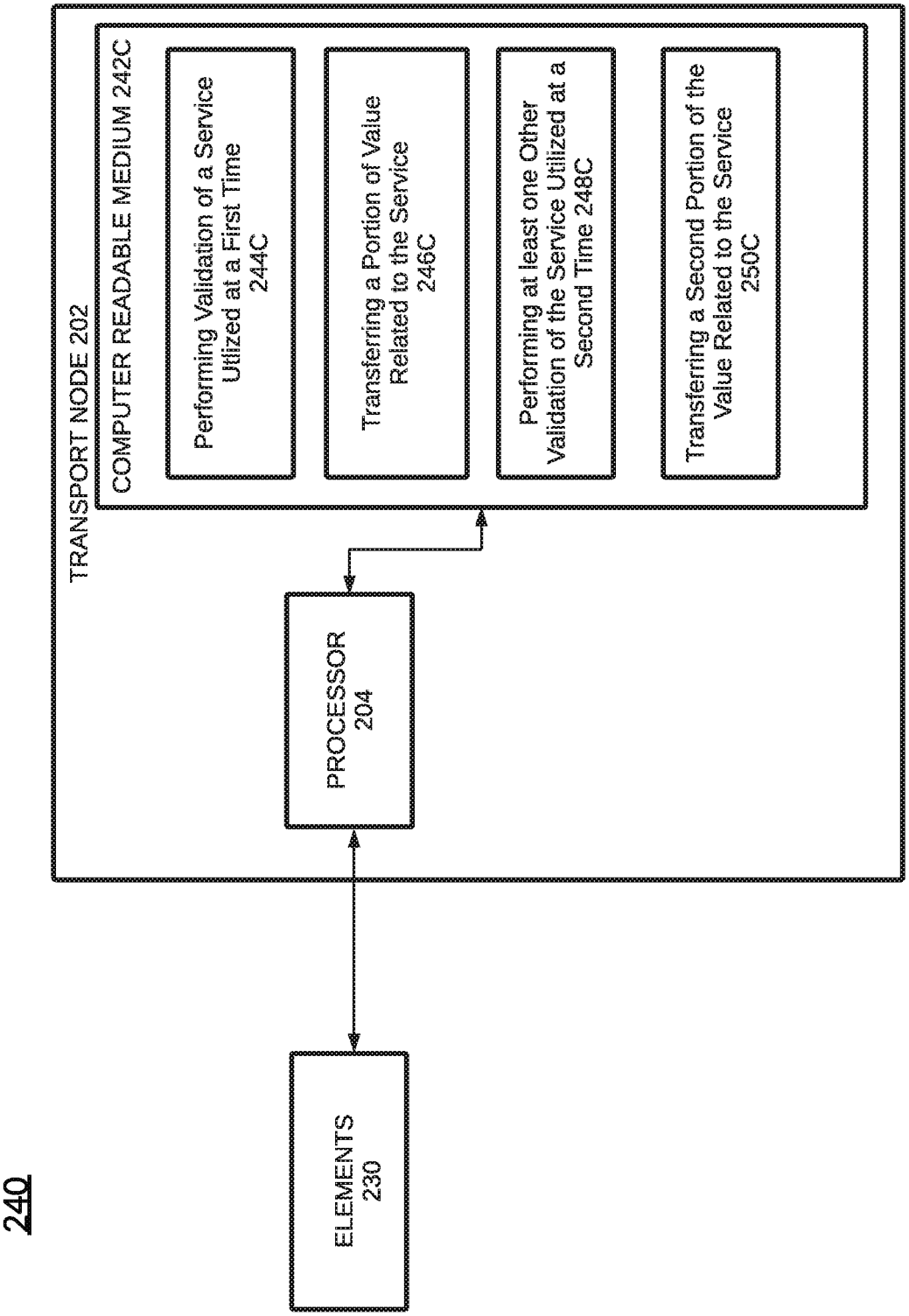
FIG. 2C is a diagram illustrating yet another transport network diagram, according to example embodiments.

FIG. 2C illustrates yet another transport network diagram 240, according to example embodiments. The network comprises elements including a transport node 202 including a processor 204 and a non-transitory computer readable medium 242C. The processor 204 is communicably coupled to the computer readable medium 242C and elements 230 (which were depicted in FIG. 2B).

The processor 204 performs one or more of performing validation of a service that is utilized at a first time in 244C, in response to the validation at the first time, transferring a portion of a value related to the service in 246C, performing at least one other validation of the service that is utilized at a second time in 248C, wherein the second time is later than the first tune, and in response to the at least one other validation at the second time, transferring a second portion of the value related to the service in 250C.

Figure 2D:
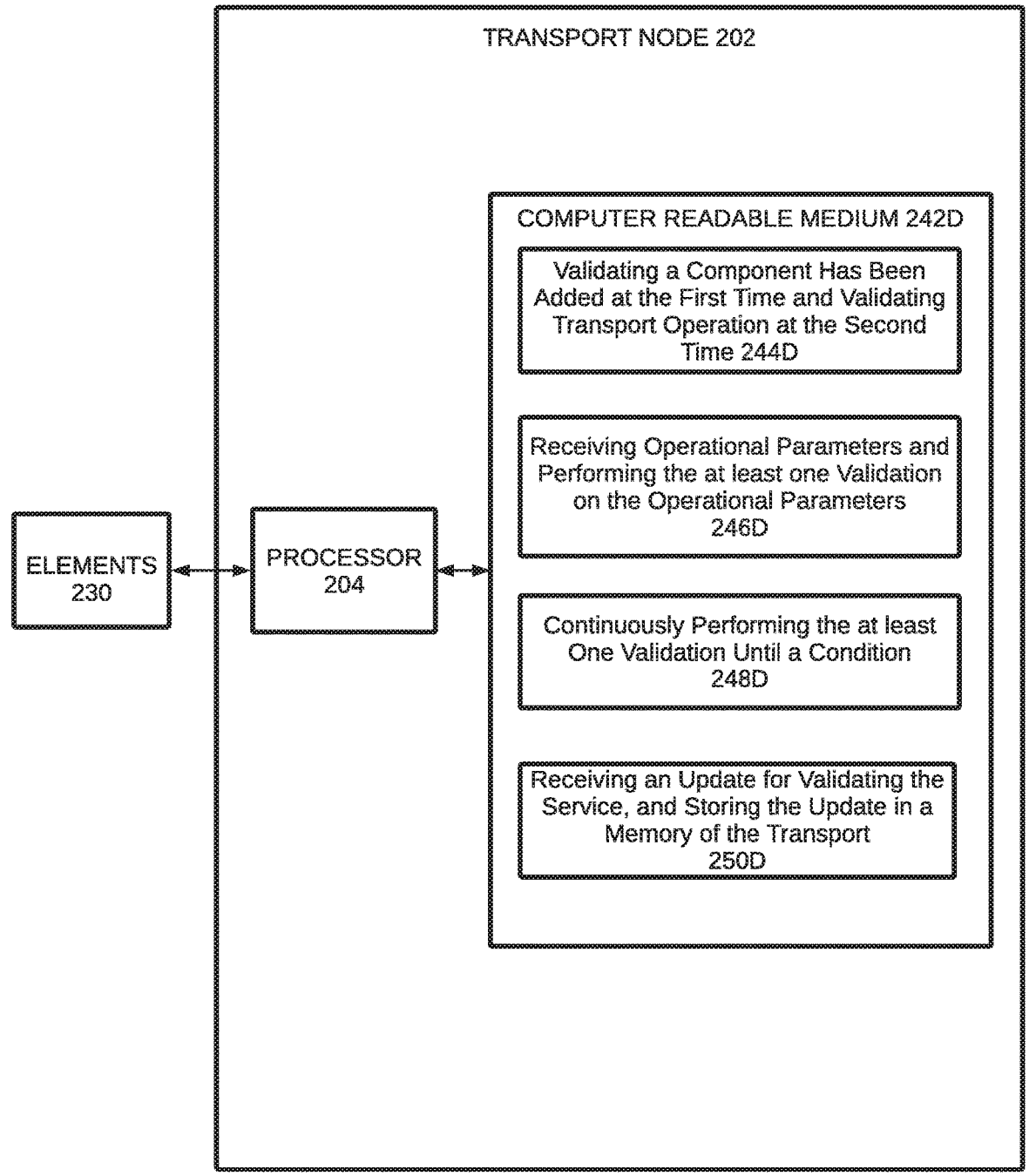
FIG. 2D is a diagram illustrating a further transport network diagram, according to example embodiments.

FIG. 2D illustrates a further transport network diagram 250, according to example embodiments. The network comprises elements including a transport node 202 including a processor 204 and a non-transitory computer readable medium 242D. The processor 204 is communicably coupled to the computer readable medium 242D and elements 230 (which were depicted in FIG. 2B).

The processor 204 performs one or more of detecting whether a component has been added to the transport, and validating an operation of the transport alter the component has been added to the transport based on sensor readings from sensor devices on the transport, in 244D, receiving operational parameters of the transport that are sensed via one or more sensors of the transport, and performing the validation of the service at the first time based on the received operational parameter in comparison to predefined thresholds for the operational parameters, in 246D, continuously performing the at least one validation until at least one of a predetermined time elapses and a predetermined distance is traveled, in 248D, and receiving a memory update comprising constraints for validating the service from a remote computing system based on current driving characteristics, and storing the memory update within a memory of the transport, in 250D. In one embodiment, a component can be an object added to a transport such as oil, a muffler, a filter, a tire, etc. and/or an object that has been removed the transport and then added back to the transport such as a tire during a rotation, a bumper after being repaired, etc.

Figure 2E:
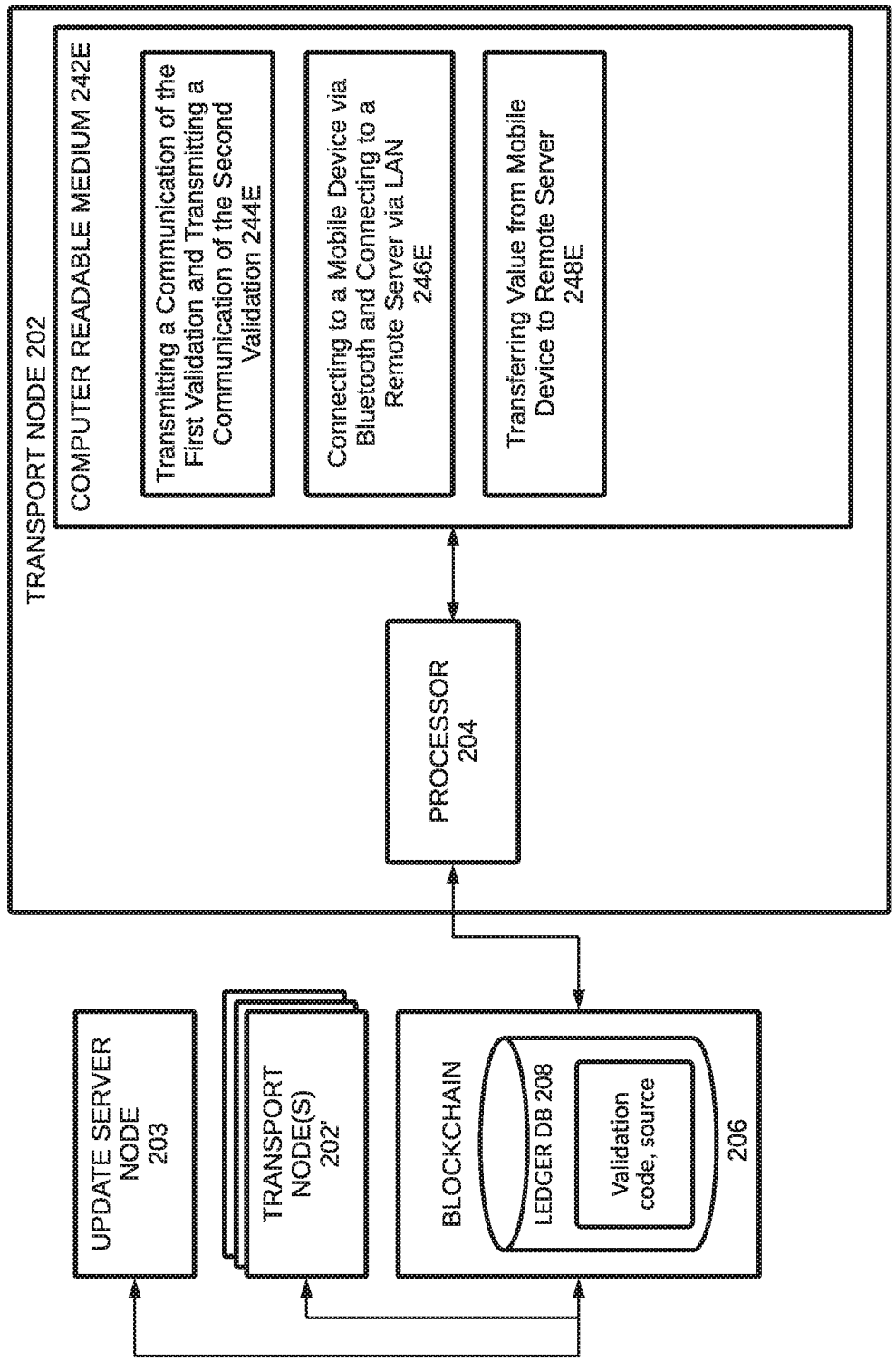
FIG. 2E is a diagram illustrating yet a further transport network diagram, according to example embodiments.

FIG. 2E illustrates yet a further transport network diagram 260, according to example embodiments. Referring to FIG. 2E, the network diagram 260 includes a transport node 202 connected to other transport nodes 202' and to an update server node 203 over a blockchain network 206. The transport nodes 202 and 202' may represent transports/vehicles. The blockchain network 206 may have a ledger 208 for storing software update validation data and a source of the validation for future use (e.g., for an audit).

While this example describes in detail only one transport node 202, multiple such nodes may be connected to the blockchain 206. It should be understood that the transport node 202 may include additional components and that some of the components described herein may be removed and/or modified without departing from a scope of the instant application. The transport node 202 may have a computing device or a server computer, or the like, and may include a processor 204, which may be a semiconductor-based microprocessor, a central processing unit (CPU), an application specific integrated circuit (ASIC), a field-programmable gate array (FPGA), and/or another hardware device. Although a single processor 204 is depicted, it should be understood that the transport node 202 may include multiple processors, multiple cores, or the like, without departing from the scope of the instant application.

The processor 204 performs one or more of transmitting a communication from the transport to a remote server of the service which indicates the performance of the validation of the service at the first time, and transmitting a second communication from the transport to the remote server of the service which indicates the performance of the at least one other validation of the service at the second time, in 244E, establishing a connection with a mobile device of the transport via a wireless channel of the transport and establishing a connection with a remote server of the service via a local area network (LAN) channel of the transport, in 246E, and transferring the value from the mobile device to the remote server, via the transport, in 248E.

The processors and/or computer readable media may fully or partially reside in the interior or exterior of the transport nodes. The steps or features stored in the computer readable media may be fully or partially performed by any of the processors and/or elements in any order. Additionally, one or more steps or features may be added, omitted, combined, performed at a later time, etc.

Figure 2F:
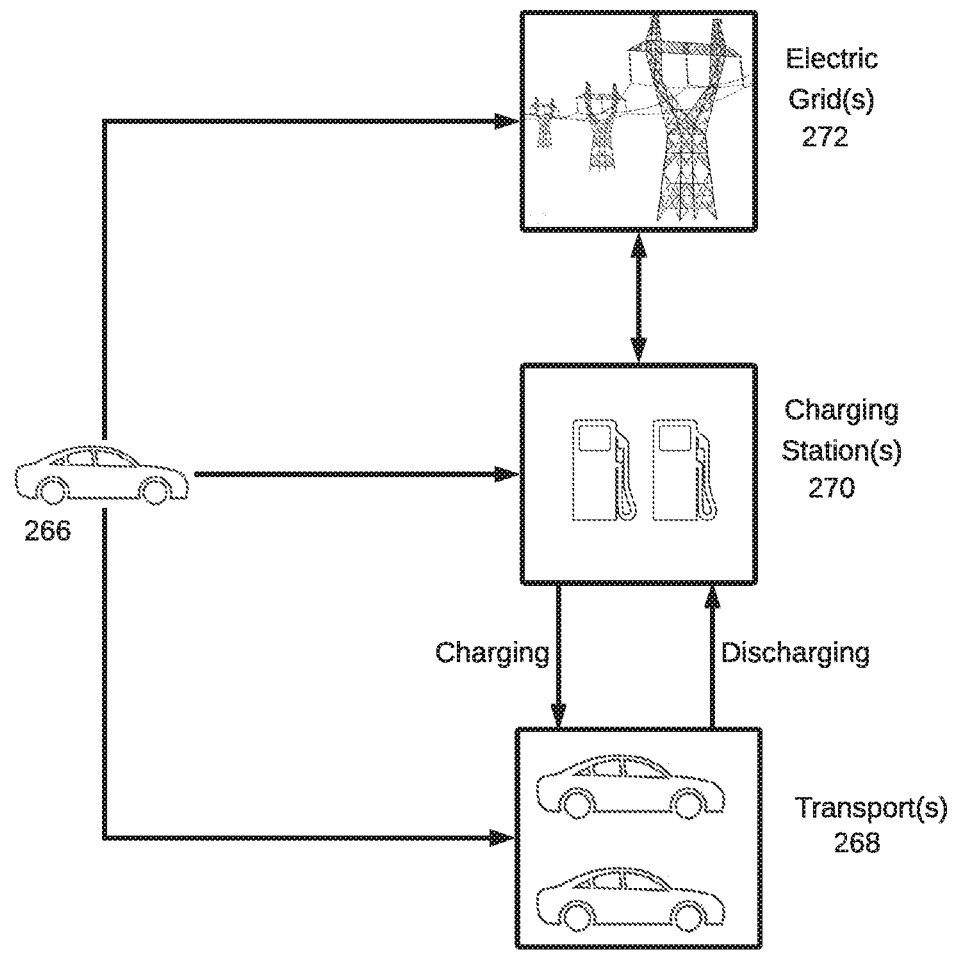
FIG. 2F is a diagram depicting electrification of one or more elements, according to example embodiments.

FIG. 2F illustrates a diagram 265 depicting electrification of one or more elements. In one embodiment, a transport 266 may provide power stored in its batteries to one or more elements including other transport(s) 268, charging station(s) 270 and electric grid(s) 272. The electric grid(s) 272 is/are coupled to one or more of the charging stations 270 which may be coupled to one or more of the transports 268. This configuration allows distribution of electricity/power received from the transport 266. The transport 266 may also interact with the other transport(s) 268, such as via Vehicle to Vehicle (V2V) technology, communication over cellular, WiFi, and the like. The transport 266 may also interact wirelessly and/or in a wired manner with other transports 268, the charging station(s) 270 and/or with the electric grid(s) 272. In one embodiment, the transport 266 is routed (or routes itself) in a safe and efficient manner to the electric grid(s) 272, the charging station(s) 270, or the other transport(s) 268. Using one or more embodiments of the instant solution, the transport 266 can provide energy to one or more of the elements depicted herein in a variety of advantageous ways as described and/or depicted herein. Further, the safety and efficiency of the transport may be increased, and the environment may be positively affected as described and/or depicted herein.

The term 'energy' may be used to denote any form of energy received, stored, used, shared and/or lost by the transport(s). The energy may be referred to in conjunction with a voltage source and/or a current supply of charge provided from an entity to the transport(s) during a charge/use operation. Energy may also be in the form of fossil fuels (for example, for use with a hybrid transport) or via alternative power sources, including but not limited to lithium based, nickel based, hydrogen fuel cells, atomic/nuclear energy, fusion based energy sources, and energy generated on-the-fly during an energy sharing and/or usage operation for increasing or decreasing one or more transports energy levels at a given time.

In one embodiment, the charging station 270 manages the amount of energy transferred from the transport 266 such that there is sufficient charge remaining in the transport 266 to arrive at a destination. In one embodiment, a wireless connection is used to wirelessly direct an amount of energy transfer between transports 268, wherein the transports may both be in motion. In one embodiment, an idle vehicle, such as a vehicle 266 (which may be autonomous) is directed to provide an amount of energy to a charging station 270 and return to the original location (for example, its original location or a different destination). In one embodiment, a mobile energy storage unit (not shown) is used to collect surplus energy from at least one other transport 268 and transfer the stored, surplus energy at a charging station 270. In one embodiment, factors determine an amount of energy to transfer to a charging station 270, such as distance, time, as well as traffic conditions, road conditions, environmental/weather conditions, the vehicle's condition (weight, etc.), an occupant(s) schedule while utilizing the vehicle, a prospective occupant(s) schedule waiting for the vehicle, etc. In one embodiment, the transport(s) 268, the charging station(s) 270 and/or the electric grid(s) 272 can provide energy to the transport 266.

In one embodiment, the solutions described and depicted herein can be utilized to determine load effects on the transport and/or the system, to provide energy to the transport and/or the system based on future needs and/or priorities, and provide intelligence between an apparatus containing a module and a vehicle allowing the processor of the apparatus to wirelessly communicate with a vehicle regarding an amount of energy store in a battery on the vehicle. In one embodiment, the solutions can also be utilized to provide charge to a location from a transport based on factors such as the temperature at the location, the cost of the energy and the power level at the location. In one embodiment, the solutions can also be utilized to manage an amount of energy remaining in a transport after a portion of charge has been transferred to a charging station. In one embodiment, the solutions can also be utilized to notify a vehicle to provide an amount of energy from batteries on the transport wherein the amount of energy to transfer is based on the distance of the transport to a module to receive the energy.

In one embodiment, the solutions can also be utilized to use a mobile energy storage unit that uses a determined path to travel to transports that have excess energy and deposit the stored energy into the electric grid. In one embodiment, the solutions can also be utilized to determine a priority of the transport's determination of the need to provide energy to grid, and the priority of a current need of the transport, such as the priority of a passenger, or upcoming passenger, or current cargo, or upcoming cargo. In one embodiment, the solutions can also be utilized to determine that when a vehicle is idle, the vehicle decides to maneuver to a location to discharge excess energy to the energy grid, then return to the previous location. In one embodiment, the solutions can also be utilized to determine an amount of energy needed by a transport to provide another transport with needed energy via transport to transport energy transfer based on one or more conditions such as weather, traffic, road conditions, car conditions, and occupants and/or goods in another transport, and instruct the transport to route to another transport and provide the energy. In one embodiment, the solutions can also be utilized to transfer energy from one vehicle in motion to another vehicle in motion. In one embodiment, the solutions can also be utilized to retrieve energy by a transport based on an expended energy by the transport to reach a meeting location with another transport, provide a service, and an estimated expended energy to return to an original location. In one embodiment, the solutions can also be utilized to provide a remaining distance needed to a charging station, and the charging station to determine an amount of energy to be retrieved from the transport wherein the amount of charge remaining is based on the remaining distance. In one embodiment, the solutions can also be utilized to manage a transport that is concurrently charged by more than one point at the same time, such as both a charging station via a wired connection and another transport via a wireless connection. In one embodiment, the solutions can also be utilized to apply a priority to the dispensing of energy to transports wherein a priority is given to those transports that will provide a portion of their stored charge to another entity such as an electric grid, a residence, and the like. Further, the instant solution as described and depicted with respect to FIG. 2F can be utilized in this and other networks and/or systems.

Figure 2G:
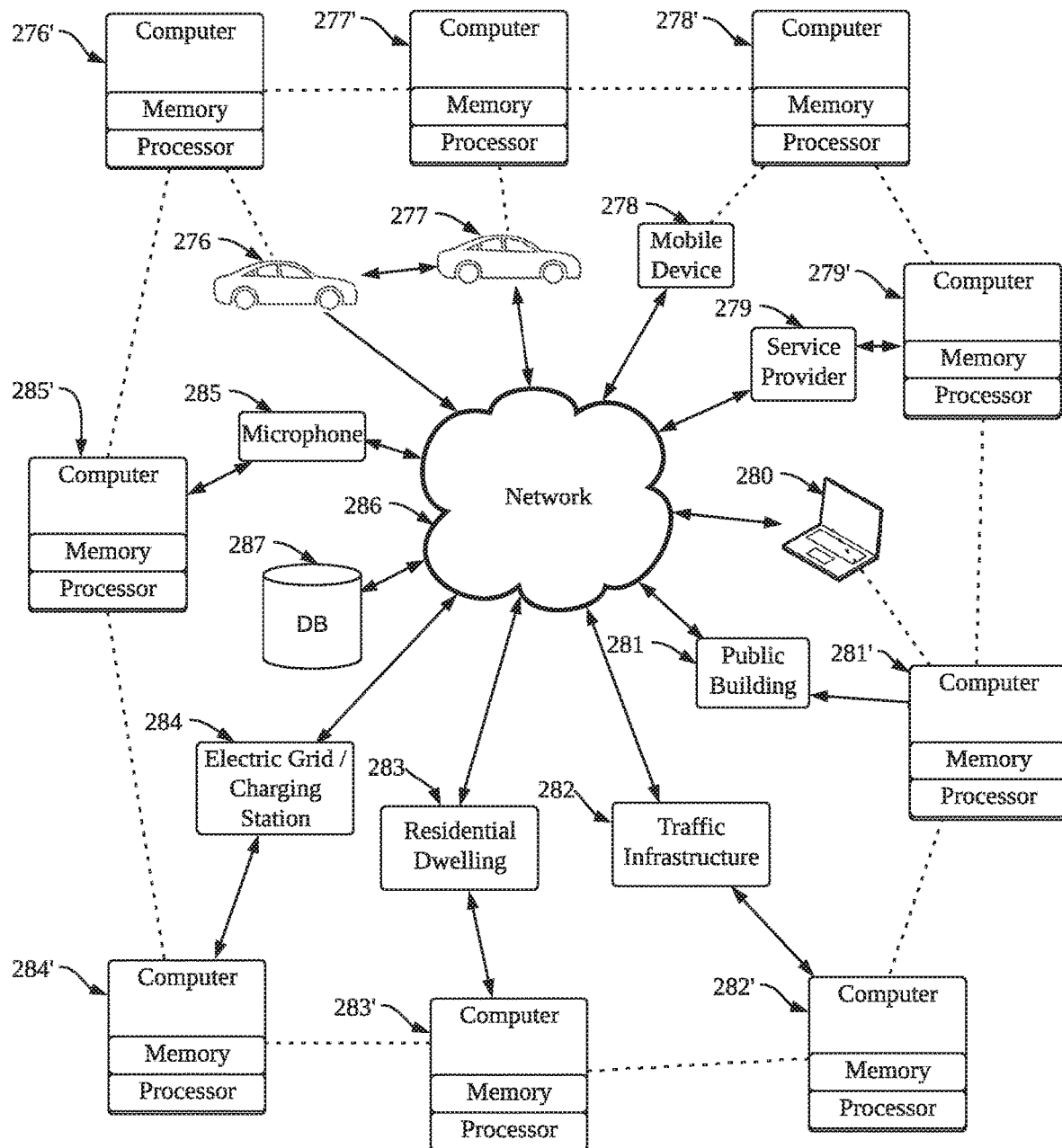
FIG. 2G is a diagram depicting interconnections between different elements in a transport network, according to example embodiments.

FIG. 2G is a diagram showing interconnections between different elements 275. The instant solution may be stored and/or executed entirely or partially on and/or by one or more computing devices 278', 279', 281', 282', 283', 284', 276', 285', 287' and 277' associated with various entities, all communicably coupled and in communication with a network 286. A database 287 is communicably coupled to the network and allows for the storage and retrieval of data. In one embodiment, the database is an immutable ledger. One or more of the various entities may be a transport 276, one or more service provider 279, one or more public buildings 281, one or more traffic infrastructure 282, one or more residential dwellings 283, an electric grid/charging station 284, a microphone 285, and/or another transport 277. Other entities and/or devices, such as one or more private users using a smartphone 278, a laptop 280, and/or a wearable device may also interwork with the instant solution. The smartphone 278, laptop 280, the microphone 285, and other devices may be connected to one or more of the connected computing devices 278', 279', 281', 282', 283', 284', 276', 285', 287', and 277'. The one or more public buildings 281 may include various agencies. The one or more public buildings 281 may utilize a computing device 281'. The one or more service provider 279 may include a dealership, a tow truck service, a collision center or other repair shop. The one or more service provider 279 may utilize a computing apparatus 279'. These various computer devices may be directly and/or communicably coupled to one another such as via wired networks, wireless networks, blockchain networks, and the like. The microphone 285 may be utilized as a virtual assistant, in one embodiment. In one embodiment, the one or more traffic infrastructure 282 may include one or more traffic signals, one or more sensors including one or more cameras, vehicle speed sensors or traffic sensors, and/or other traffic infrastructure. The one or more traffic infrastructure 282 may utilize a computing device 282'.

In one embodiment, a transport 277/276 is capable of transporting a person, an object, a permanently or temporarily affixed apparatus, and the like. In one embodiment, the transport 277 may communicate with transport 276 via V2V communication, through the computers associated with each transport 276' and 277' and may be referred to as a transport, car, vehicle, automobile, and the like. The transport 276/277 may be a self-propelled wheeled conveyance, such as a car, a sports utility vehicle, a truck, a bus, a van, or other motor or battery-driven or fuel cell-driven transport. For example, transport 276/277 may be an electric vehicle, a hybrid vehicle, a hydrogen fuel cell vehicle, a plug-in hybrid vehicle, or any other type of vehicle that has a fuel cell stack, a motor, and/or a generator. Other examples of vehicles include bicycles, scooters, trains, planes, or boats, and any other form of conveyance that is capable of transportation. The transport 276/277 may be semi-autonomous or autonomous. For example, transport 276/277 may be self-maneuvering and navigate without human input. An autonomous vehicle may have and use one or more sensors and/or a navigation unit to drive autonomously.

In one embodiment, the solutions described and depicted herein can be utilized to determine an access to a transport via consensus of blockchain. In one embodiment, the solutions can also be utilized to perform profile validation before allowing an occupant to use a transport. In one embodiment, the solutions can also be utilized to have the transport indicate (visually, but also verbally in another embodiment, etc.) on or from the transport for an action the user needs to perform (that could be pre-recorded) and verify that it is the correct action. In one embodiment, the solutions can also be utilized to provide an ability to for a transport to determine, based on the risk level associated with data and driving environment, how to bifurcate the data and distribute a portion of the bifurcated data, with a lower risk level during a safe driving environment, to the occupant, and later distributing a remaining portion of the bifurcated data, with a higher risk level, to the occupant after the occupant has departed the transport. In one embodiment, the solutions can also be utilized to handle the transfer of a vehicle across boundaries (such as a country/state/etc.) through the use of blockchain and/or smart contracts and apply the rules of the new area to the vehicle.

In one embodiment, the solutions can also be utilized to allow a transport to continue to operate outside a boundary when a consensus is reached by the transport based on the operation of the transport and characteristics of an occupant of the transport. In one embodiment, the solutions can also be utilized to analyze the available data upload/download speed of a transport, size of the file and speed/direction the transport is traveling, to determine the distance needed to complete a data upload/download and assign a secure area boundary for the data upload/download to be executed. In one embodiment, the solutions can also be utilized to perform a normally dangerous maneuver in a safe manner, such as when the system determines that an exit is upcoming and when the transport is seemingly not prepared to exit (e.g. in the incorrect lane or traveling at a speed that is not conducive to making the upcoming exit) and instruct the subject transport as well as other proximate transports to allow the subject transport to exit in a safe manner. In one embodiment, the solutions can also be utilized to use one or more vehicles to validate diagnostics of another transport while both the one or more vehicles and the other transport are in motion.

In one embodiment, the solutions can also be utilized to detect lane usage at a location and time of day to either inform an occupant of a transport or direct the transport to recommend or not recommend a lane change. In one embodiment, the solutions can also be utilized to eliminate the need to send information through the mail and the need for a driver/occupant to respond by making a payment through the mail or in person. In one embodiment, the solutions can also be utilized to provide a service to an occupant of a transport, wherein the service provided is based on a subscription, and wherein the permission is acquired from other transports connected to the profile of the occupant. In one embodiment, the solutions can also be utilized to record changes in the condition of a rented object. In one embodiment, the solutions can also be utilized to seek a blockchain consensus from other transports that are in proximity to a damaged transport. In one embodiment, the solutions can also be utilized to receive media, from a server such as an insurance entity server, from the transport computer, which may be related to an accident. The server accesses one or more media files to access the damage to the transport and stores the damage assessment onto a blockchain. In one embodiment, the solutions can also be utilized to obtain a consensus to determine the severity of an event from a number of devices over various times prior to the event related to a transport.

In one embodiment, the solutions can also be utilized to solve a problem with a lack of video evidence for transport-related accidents. The current solution details the querying of media, by the transport involved in the accident, related to the accident from other transports that may have been proximate to the accident. In one embodiment, the solutions can also be utilized to utilize transports and other devices (for example, a pedestrian's cell phone, a streetlight camera, etc.) to record specific portions of a damaged transport.

In one embodiment, the solutions can also be utilized to warn an occupant when a transport is navigating toward a dangerous area and/or event, allowing for a transport to notify occupants or a central controller of a potentially dangerous area on or near the current transport route. In one embodiment, the solutions can also be utilized to detect when a transport traveling at a high rate of speed, at least one other transport is used to assist in slowing down the transport in a manner that minimally affects traffic. In one embodiment, the solutions can also be utilized to identify a dangerous driving situation where media is captured by the vehicle involved in the dangerous driving situation. A geofence is established based on the distance of the dangerous driving situation, and additional media is captured by at least one other vehicle within the established geofence. In one embodiment, the solutions can also be utilized to send a notification to one or more occupants of a transport that that transport is approaching a traffic control marking on a road, then if a transport crosses a marking, receiving indications of poor driving from other, nearby transports. In one embodiment, the solutions can also be utilized to make a transport partially inoperable by (in certain embodiments), limiting speed, limiting the ability to be near another vehicle, limiting speed to a maximum, and allowing only a given number of miles allowed per time period.

In one embodiment, the solutions can also be utilized to overcome a need for reliance on software updates to correct issues with a transport when the transport is not being operated correctly. Through the observation of other transports on a route, a server will receive data from potentially multiple other transports observing an unsafe or incorrect operation of a transport. Through analysis, these observations may result in a notification to the transport when the data suggest an unsafe or incorrect operation. In one embodiment, the solutions can also be utilized to provide notification between a transport and a potentially dangerous situation involving a person external to the transport. In one embodiment, the solutions can also be utilized to send data to a server by devices either associated with an accident with a transport, or devices proximate to the accident. Based on the severity of the accident or near accident, the server notifies the senders of the data. In one embodiment, the solutions can also be utilized to provide recommendations for operating a transport to either a driver or occupant of a transport based on the analysis of data. In one embodiment, the solutions can also be utilized to establish a geo-fence associated with a physical structure and determining payment responsibility to the transport. In one embodiment, the solutions can also be utilized to coordinate the ability to drop off a vehicle at a location using both the current state at the location, and a proposed future state using navigation destinations of other vehicles. In one embodiment, the solutions can also be utilized to coordinate the ability to automatically arrange for the drop off of a vehicle at a location such as a transport rental entity.

In one embodiment, the solutions can also be utilized to move transport to another location based on a user's event. More particularly, the system tracks a user's device, and modifies the transport to be moved proximate to the user upon the conclusion of the original event, or a modified event. In one embodiment, the solutions can also be utilized to allow for the validation of available locations within an area through the existing transports within the area. The approximate time when a location may be vacated is also determined based on verifications from the existing transports. In one embodiment, the solutions can also be utilized to move a transport to closer parking spaces as one becomes available and the elapsed time since initially parking is less than the average time of the event. Furthermore, moving the transport to a final parking space when the event is completed or according to a location of a device associated with at least one occupant of the transport. In one embodiment, the solutions can also be utilized to plan for the parking prior to the upcoming crowd. The system interacts with the transport to offer some services at a less than full price and/or guide the transport to alternative parking locations based on a priority of the transport, increasing optimization of the parking situation before arriving.

In one embodiment, the solutions can also be utilized to sell fractional ownership in transports or in determining pricing and availability in ride-sharing applications. In one embodiment, the solutions can also be utilized to provide accurate and timely reports of dealership sales activities well beyond what is currently available. In one embodiment, the solutions can also be utilized to allow a dealership to request an asset over the blockchain. By using the blockchain, a consensus is obtained before any asset is moved. Additionally, the process is automated, and payment may be initiated over the blockchain. In one embodiment, the solutions can also be utilized to arrange agreements that are made with multiple entities (such as service centers) wherein a consensus is acquired, and an action performed (such as diagnostics). In one embodiment, the solutions can also be utilized to associate digital keys with multiple users. A first user may be the operator of the transport, and a second user is the responsible party for the transport. These keys are authorized by a server where the proximity of the keys are validated against the location of a service provider. In one embodiment, the solutions can also be utilized to determine a needed service on a transport destination. One or more service locations are located that are able to provide the needed service that is both within an area on route to the destination and has availability to perform the service. The navigation of the transport is updated with the determined service location. A smart contract is identified that contains a compensation value for the service, and a blockchain transaction is stored in a distributed ledger for the transaction.

In one embodiment, the solutions can also be utilized to interfacing a service provider transport with a profile of an occupant of a transport to determine services and goods which may be of interest to occupants in a transport. These services and goods are determined by an occupant's history and/or preferences. The transport then receives offers from the service provider transport and, in another embodiment, meets the transport to provide the service/good. In one embodiment, the solutions can also be utilized to detect a transport within a range and send a service offer to the transport (such as a maintenance offer, a product offer, or the like). An agreement is made between the system and the transport, and a service provider is selected by the system to provide the agreement. In one embodiment, the solutions can also be utilized to assign one or more transports as a roadway manager, where the roadway manager assists in the control of traffic. The roadway manager may generate a roadway indicator (such as lights, displays, sounds) to assist in the flow of traffic. In one embodiment, the solutions can also be utilized to alert a driver of a transport by a device, wherein the device may be the traffic light or near an intersection. The alert is sent upon an event, such as when a light turns green and the transport in the front of a list of transports does not move.

Figure 2H:
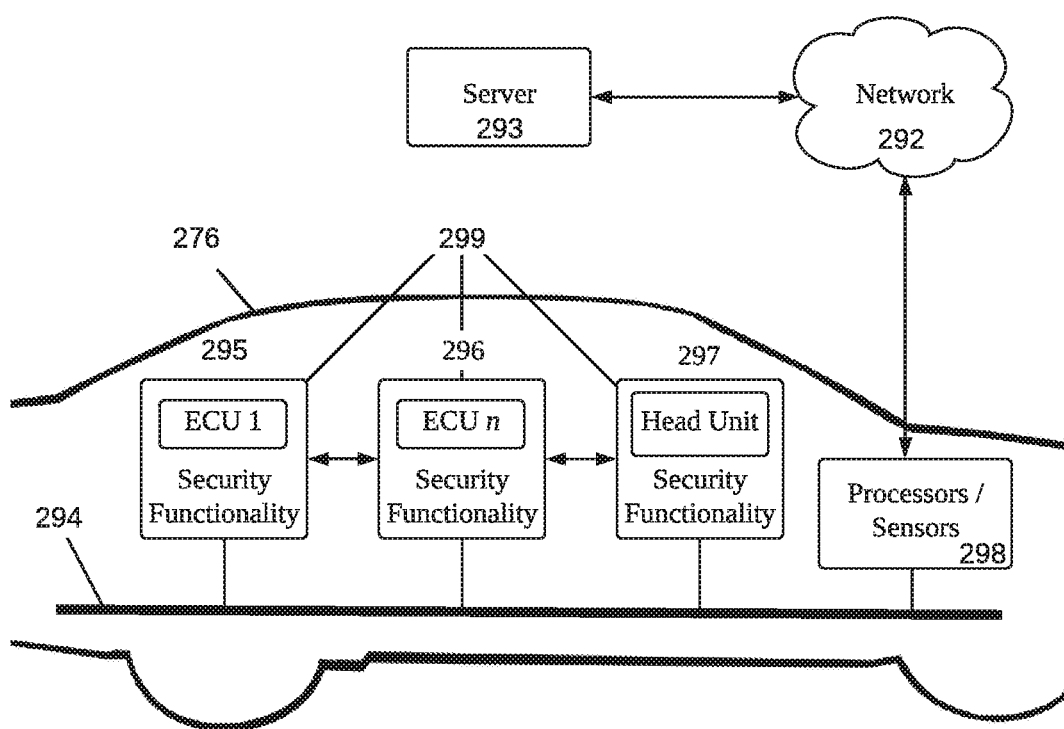
FIG. 2H is a further diagram depicting interconnections between different elements in a transport network, according to example embodiments.

FIG. 2H is another block diagram showing interconnections between different elements in one example 290. A transport 276 is presented and includes ECUs 295, 296, and a Head Unit (otherwise known as an Infotainment System) 297. An Electrical Control Unit (ECU) is an embedded system in automotive electronics controlling one or more of the electrical systems or subsystems in a transport. ECUs may include but are not limited to the management of a transport's engine, brake system, gearbox system, door locks, dashboard, airbag system, infotainment system, electronic differential, and active suspension. ECUs are connected to the transport's Controller Area Network (CAN) bus 294. The ECUs may also communicate with a transport computer 298 via the CAN bus 294. The transport's processors/sensors (such as the transport computer) 298 can communicate with external elements, such as a server 293 via a network 292 (such as the Internet). Each ECU 295, 296 and Head Unit 297 may contain its own security policy. The security policy defines permissible processes that are able to be executed in the proper context. In one embodiment, the security policy may be partially or entirely provided in the transport computer 298.

ECUs 295, 296 and Head Unit 297 may each include a custom security functionality element 299 defining authorized processes and contexts within which those processes are permitted to run. Context-based authorization to determine validity if a process is able to be executed allows ECUs to maintain secure operation and prevent unauthorized access from elements such as the transport's Controller Area Network (CAN Bus). When an ECU encounters a process that is unauthorized, that ECU can block the process from operating. Automotive ECUs can use different contexts to determine whether a process is operating within its permitted bounds, such as proximity contexts such as nearby objects, distance to approaching objects, speed, and trajectory relative to other moving objects, operational contexts such as an indication of whether the transport is moving or parked, the transport's current speed, the transmission state, user-related contexts such as devices connected to the transport via wireless protocols, use of the infotainment, cruise control, parking assist, driving assist, location-based contexts, and/or other contexts.

In one embodiment, the solutions described and depicted herein can be utilized to make a transport partially inoperable by (in certain embodiments), limiting speed, limiting the ability to be near another vehicle, limiting speed to a maximum, and allowing only a given numbers of miles allowed per time period. In one embodiment, the solutions can also be utilized to use a blockchain to facilitate exchange of vehicle possession wherein data is sent to a server by devices either associated with an accident with a transport, or devices proximate to the accident. Based on the severity of the accident or near accident, the server notifies the senders of the data. In one embodiment, the solutions can also be utilized to help the transport to avoid accidents, such as when the transport is involved in an accident by a server that queries other transports that are proximate to the accident. The server seeks to obtain data from the other transports, allowing the server to gain an understanding of the nature of the accident from multiple vantage points. In one embodiment, the solutions can also be utilized to determine that sounds from a transport are atypical and transmit data related to the sounds as well as a possible source location to a server wherein the server can determine possible causes and avoid a potentially dangerous situation. In one embodiment, the solutions can also be utilized to establish a location boundary via the system when a transport is involved in an accident. This boundary is based on decibels associated with the accident. Multimedia content for a device within the boundary is obtained to assist in further understanding the scenario of the accident. In one embodiment, the solutions can also be utilized to associate a vehicle with an accident, then capture media obtained by devices proximate to the location of the accident. The captured media is saved as a media segment. The media segment is sent to another computing device which builds a sound profile of the accident. This sound profile will assist in understanding more details surrounding the accident.

In one embodiment, the solutions can also be utilized to utilize sensors to record audio, video, motion, etc. to record an area where a potential event has occurred, such as if a transport comes in contact or may come in contact with another transport (while moving or parked), the system captures data from the sensors which may reside on one or more of the transports and/or on fixed or mobile objects. In one embodiment, the solutions can also be utilized to determine that a transport has been damaged by using sensor data to identify a new condition of the transport during a transport event and comparing the condition to a transport condition profile, making it possible to safely and securely capture critical data from a transport that is about to be engaged in a detrimental event.

In one embodiment, the solutions can also be utilized to warn occupants of a transport when the transport, via one or more sensors, has determined that it is approaching or going down a one-way road the incorrect way. The transport has sensors/cameras/maps interacting with the system of the current solution. The system knows the geographic location of one-way streets. The system may audibly inform the occupants, "Approaching a one-way street", for example. In one embodiment, the solutions can also be utilized to allow the transport to get paid allowing autonomous vehicle owners to monetize the data their vehicle sensors collect and store creating an incentive for vehicle owners to share their data and provide entities with additional data through which to improve the performance of future vehicles, provide services to the vehicle owners, etc.

In one embodiment, the solutions can also be utilized to either increase or decrease a vehicle's features according to the action of the vehicle over a period of time. In one embodiment, the solutions can also be utilized to assign a fractional ownership to a transport. Sensor data related to one or more transports and a device proximate to the transport are used to determine a condition of the transport. The fractional ownership of the transport is determined based on the condition and a new responsibility of the transport is provided. In one embodiment, the solutions can also be utilized to provide data to a replacement/upfitting component, wherein the data attempts to subvert an authorized functionality of the replacement/upfitting component, and responsive to a non-subversion of the authorized functionality, permitting, by the component, use of the authorized functionality of the replacement/upfitting component.

In one embodiment, the solutions can also be utilized to provide individuals the ability to ensure that an occupant should be in a transport and for that occupant to reach a particular destination. Further, the system ensures a driver (if a non-autonomous transport) and/or other occupants are authorized to interact with the occupant. Also, pickups, drop-offs and location are noted. All of the above are stored in an immutable fashion on a blockchain. In one embodiment, the solutions can also be utilized to determine characteristics of a driver via an analysis of driving style and other elements to take action in the event that the driver is not driving in a normal manner, such as a manner in which the driver has previously driven in a particular condition, for example during the day, at night, in the rain, in the snow, etc. Further, the attributes of the transport are also taken into account. Attributes consist of weather, whether the headlights are on, whether navigation is being used, a HUD is being used, volume of media being played, etc. In one embodiment, the solutions can also be utilized to notify occupants in a transport of a dangerous situation when items inside the transport signify that the occupants may not be aware of the dangerous situation.

In one embodiment, the solutions can also be utilized to mount calibration devices on a rig that is fixed to a vehicle wherein the various sensors on the transport are able to automatically self-adjust based on what should be detected by the calibration devices as compared to what is actually detected. In one embodiment, the solutions can also be utilized to use a blockchain to require consensus from a plurality of service centers when a transport needing service sends malfunction information allowing remote diagnostic functionality wherein a consensus is required from other service centers on what a severity threshold is for the data. Once the consensus is received, the service center may send the malfunction security level to the blockchain to be stored. In one embodiment, the solutions can also be utilized to determine a difference in sensor data external to the transport and the transport's own sensor data. The transport requests, from a server, a software to rectify the issue. In one embodiment, the solutions can also be utilized to allow for the messaging of transports that are either nearby, or in the area, when an event occurs (e.g. a collision).

Figure 2I:
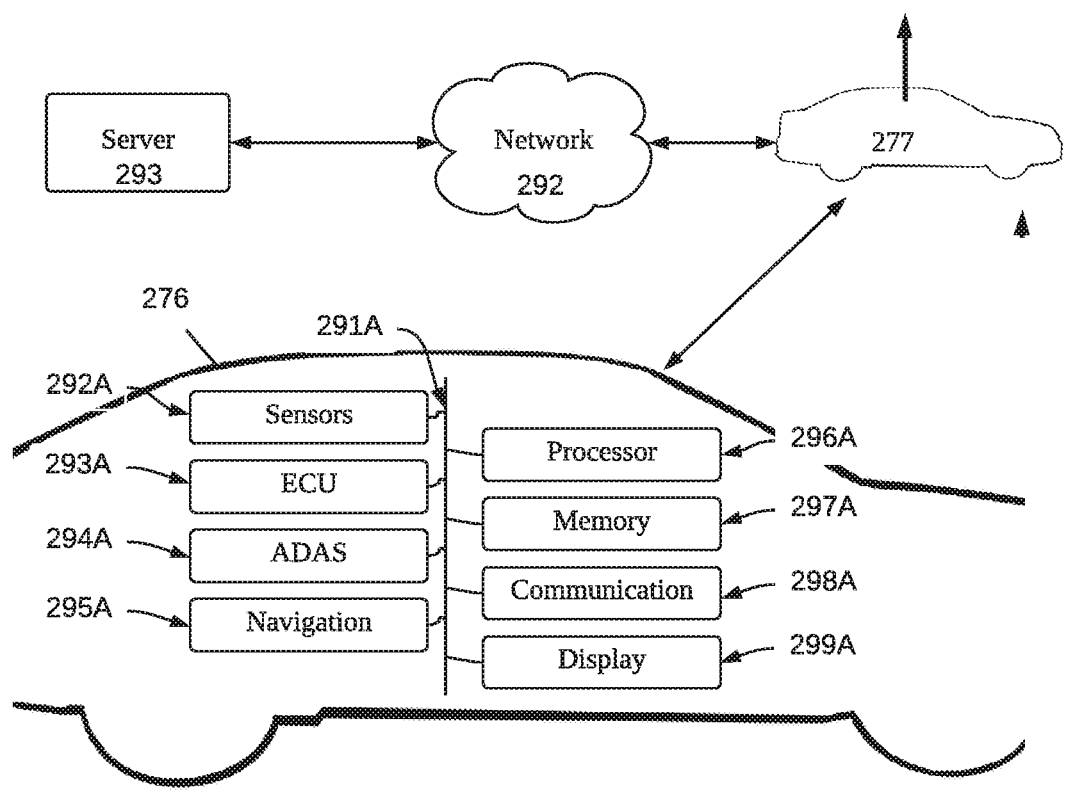
FIG. 2I is yet a further diagram depicting interconnections between elements in a transport network, according to example embodiments.

Referring to FIG. 2I, an operating environment 290A for a connected transport is illustrated according to some embodiments. As depicted, the transport 276 includes a Controller Area Network (CAN) bus 291A connecting elements 292A—299A of the transport. Other elements may be connected to the CAN bus and are not depicted herein. The depicted elements connected to the CAN bus include a sensor set 292A, Electronic Control Units 293A, autonomous features or Advanced Driver Assistance Systems (ADAS) 294A, and the navigation system 295A. In some embodiments, the transport 276 includes a processor 296A, a memory 297A, a communication unit 298A, and an electronic display 299A.

The processor 296A includes an arithmetic logic unit, a microprocessor, a general-purpose controller, and/or a similar processor array to perform computations and provide electronic display signals to a display unit 299A. The processor 296A processes data signals and may include various computing architectures including a complex instruction set computer (CISC) architecture, a reduced instruction set computer (RISC) architecture, or an architecture implementing a combination of instruction sets. The transport 276 may include one or more processors 296A. Other processors, operating systems, sensors, displays, and physical configurations that are communicably coupled to one another (not depicted) may be used with the instant solution.

Memory 297A is a non-transitory memory storing instructions or data that may be accessed and executed by the processor 296A. The instructions and/or data may include code to perform the techniques described herein. The memory 297A may be a dynamic random-access memory (DRAM) device, a static random-access memory (SRAM) device, flash memory, or some other memory device. In some embodiments, the memory 297A also may include non-volatile memory or a similar permanent storage device and media which may include a hard disk drive, a floppy disk drive, a CD-ROM device, a DVD-ROM device, a DVD-RAM device, a DVD-RW device, a flash memory device, or some other mass storage device for storing information on a permanent basis. A portion of the memory 297A may be reserved for use as a buffer or virtual random-access memory (virtual RAM). The transport 276 may include one or more memories 297A without deviating from the current solution.

The memory 297A of the transport 276 may store one or more of the following types of data: navigation route data 295A, and autonomous features data 294A. In some embodiments, the memory 297A stores data that may be necessary for the navigation application 295A to provide the functions.

The navigation system 295A may describe at least one navigation route including a start point and an endpoint. In some embodiments, the navigation system 295A of the transport 276 receives a request from a user for navigation routes wherein the request includes a starting point and an ending point. The navigation system 295A may query a real-time data server 293 (via a network 292), such as a server that provides driving directions, for navigation route data corresponding to navigation routes including the start point and the endpoint. The real-time data server 293 transmits the navigation route data to the transport 276 via a wireless network 292 and the communication system 298A stores the navigation data 295A in the memory 297A of the transport 276.

The ECU 293A controls the operation of many of the systems of the transport 276, including the ADAS systems 294A. The ECU 293A may, responsive to instructions received from the navigation system 295A, deactivate any unsafe and/or unselected autonomous features for the duration of a journey controlled by the ADAS systems 294A. In this way, the navigation system 295A may control whether ADAS systems 294A are activated or enabled so that they may be activated for a given navigation route.

The sensor set 292A may include any sensors in the transport 276 generating sensor data. For example, the sensor set 292A may include short-range sensors and long-range sensors. In some embodiments, the sensor set 292A of the transport 276 may include one or more of the following vehicle sensors: a camera, a LIDAR sensor, an ultrasonic sensor, an automobile engine sensor, a radar sensor, a laser altimeter, a manifold absolute pressure sensor, an infrared detector, a motion detector, a thermostat, a sound detector, a carbon monoxide sensor, a carbon dioxide sensor, an oxygen sensor, a mass airflow sensor, an engine coolant temperature sensor, a throttle position sensor, a crankshaft position sensor, a valve timer, an air-fuel ratio meter, a blind spot meter, a curb feeler, a defect detector, a Hall effect sensor, a parking sensor, a radar gun, a speedometer, a speed sensor, a tire-pressure monitoring sensor, a torque sensor, a transmission fluid temperature sensor, a turbine speed sensor (TSS), a variable reluctance sensor, a vehicle speed sensor (VSS), a water sensor, a wheel speed sensor, a GPS sensor, a mapping functionality, and any other type of automotive sensor. The navigation system 295A may store the sensor data in the memory 297A.

The communication unit 298A transmits and receives data to and from the network 292 or to another communication channel. In some embodiments, the communication unit 298A may include a DSRC transceiver, a DSRC receiver and other hardware or software necessary to make the transport 276 a DSRC-equipped device.

The transport 276 may interact with other transports 277 via V2V technology. V2V communication includes sensing radar information corresponding to relative distances to external objects, receiving GPS information of the transports, setting areas as areas where the other transports 277 are located based on the sensed radar information, calculating probabilities that the GPS information of the object vehicles will be located at the set areas, and identifying transports and/or objects corresponding to the radar information and the GPS information of the object vehicles based on the calculated probabilities, in one embodiment.

In one embodiment, the solutions described and depicted herein can be utilized to manage emergency scenarios and transport features when a transport is determined to be entering an area without network access. In one embodiment, the solutions can also be utilized to manage and provide features in a transport (such as audio, video, navigation, etc.) without network connection. In one embodiment, the solutions can also be utilized to determine when a profile of a person in proximity to the transport matches profile attributes of a profile of at least one occupant in the transport. A notification is sent from the transport to establish communication.

In one embodiment, the solutions can also be utilized to analyze the availability of occupants in respective transports that are available for a voice communication based on an amount of time remaining in the transport and context of the communication to be performed. In one embodiment, the solutions can also be utilized to determine two levels of threat of roadway obstruction and receiving a gesture that may indicate that the obstruction is not rising to an alert above a threshold, and proceeding, by the transport along the roadway. In one embodiment, the solutions can also be utilized to delete sensitive data from a transport when the transport has had damage such that it is rendered unable to be used.

In one embodiment, the solutions can also be utilized to verify that the customer data to be removed has truly been removed from all of the required locations within the enterprise demonstrating GDPR compliance. In one embodiment, the solutions can also be utilized to provide consideration from one transport to another transport in exchange for data related to safety, important notifications, etc. to enhance the autonomous capabilities of the lower level autonomous vehicle. In one embodiment, the solutions can also be utilized to provide an ability for a transport to receive data based on a first biometric associated with an occupant. Then the transport unencrypts the encrypted data based on a verification of a second biometric, wherein the second biometric is a continuum of the first biometric. The transport provides the unencrypted data to the occupant when only the occupant is able to receive the unencrypted data and deletes a sensitive portion of the unencrypted data as the sensitive portion is being provided and a non-sensitive portion after a period of time associated with the biometric elapses. In one embodiment, the solutions can also be utilized to provide an ability for a transport to validate an individual based on a weight and grip pressure applied to the steering wheel of the transport. In one embodiment, the solutions can also be utilized to provide a feature to a car that exists but is not currently enabled presenting features to an occupant of the automobile that reflects the occupant's characteristics.

In one embodiment, the solutions can also be utilized to allow for the modification of a transport, particularly the interior of the transport as well as the exterior of the transport to reflect, and assist at least one occupant, in one embodiment. In another embodiment, recreating an occupant's work and/or home environment is disclosed. The system may attempt to "recreate" the user's work/home environment while the user is in the transport if it determines that the user is in "work mode" or "home mode". All data related to the interior and exterior of the transport as well as the various occupants utilizing the transport are stored on a blockchain and executed via smart contracts. In one embodiment, the solutions can also be utilized to detect occupant gestures to assist in communicating with nearby transports wherein the transport may maneuver accordingly. In one embodiment, the solutions can also be utilized to provide the ability for a transport to detect intended gestures using a gesture definition datastore. In one embodiment, the solutions can also be utilized to provide an ability for a transport to take various actions based on a gait and a gesture of a user. In one embodiment, the solutions can also be utilized to ensure that a driver of a transport that is currently engaged in various operations (for example, driving while talking with navigation on, etc.) does not exceed an unsafe number of operations before being permitted to gesture.

In one embodiment, the solutions can also be utilized to assign a status to each occupant in a transport and validating a gesture from an occupant based on the occupant's status. In one embodiment, the solutions can also be utilized to collect details of sound related to a collision (in what location, in what direction, rising or falling, from what device, data associated with the device such as type, manufacturer, owner, as well as the number of contemporaneous sounds, and the times the sounds were emanated, etc.) and provide to the system where analysis of the data assists in determining details regarding the collision. In one embodiment, the solutions can also be utilized to provide a determination that a transport is unsafe to operate. The transport includes multiple components that interoperate to control the transport, and each component is associated with a separate component key. A cryptographic key is sent to the transport to decrease transport functionality. In response to receiving the cryptographic key, the transport disables one or more of the component keys. Disabling the one or more component keys results in one or more of limiting the transport to not move greater than a given speed, limiting the transport to not come closer than a distance to another transport, and limiting the transport to not travel greater than a threshold distance.

In one embodiment, the solutions can also be utilized to provide an indication from one specific transport (that is about to vacate a location) to another specific transport (that is seeking to occupy a location), a blockchain is used to perform authentication and coordination. In one embodiment, the solutions can also be utilized to determine a fractional responsibility for a transport. Such as the case where multiple people own a single transport, and the use of the transport, which may change over a period of time, is used by the system to update the fractional ownership. Other embodiments will be included in the application including a minimal ownership of a transport based on not the use of the transport, but the availability of the transport, and the determination of the driver of the transport as well as others.

In one embodiment, the solutions can also be utilized to permit in a transport a user to his/her subscriptions with a closed group of people such as family members or friends.

For example, a user might want to share a membership, and if so, associated transactions are stored in a blockchain or traditional database. When the subscribed materials are requested by a user, who is not a primary subscriber, a blockchain node (i.e., a transport) can verify that a person requesting a service is an authorized person with whom the subscriber has shared the profile. In one embodiment, the solutions can also be utilized to allow a person to utilize supplemental transport(s) to arrive at an intended destination. A functional relationship value (e.g. value that indicates the various parameters and their importance in determining what type of alternate transport to utilize) is used in determining the supplemental transport. In one embodiment, the solutions can also be utilized to allow the occupants in an accident to have access to other transports to continue to their initial destination.

In one embodiment, the solutions can also be utilized to propagate a software/firmware upload to a first subset of transports. This first set of transports test the update, and when the test is successful, the update is propagated to a further set of transports. In one embodiment, the solutions can also be utilized to propagate software/firmware updates to vehicles from a master transport where the update is propagated through the network of vehicles from a first subset, then a larger subset, etc. A portion of the update may be first sent, then the remaining portion sent from the same or another vehicle. In one embodiment, the solutions can also be utilized to provide an update for a transport's computer to the transport and a transport operator's/occupant's device. The update is may be authorized by all drivers and/or all occupants. The software update is provided to the vehicle and the device(s). The user doesn't have to do anything but go proximate to the vehicle and the functionality automatically occurs. A notification is sent to the device(s) indicating that the software update is completed. In one embodiment, the solutions can also be utilized to validate that an OTA software update is performed by a qualified technician and generation, by the one or more transport components, of a status related to: an originator of the validation code, a procedure for wirelessly receiving the software update, information contained in the software update, and results of the validation.

In one embodiment, the solutions can also be utilized to provide the ability to parse a software update located in a first component by a second component. Then verifying the first portion of critical updates and a second portion of non-critical updates, assigning the verified first portion to one process in the transport, running the verified first portion with the one process for a period of time, and responsive to positive results based on the period of time, running the verified first portion with other processes after the period of time. In one embodiment, the solutions can also be utilized to provide a selection of services to an occupant where the services are based on a profile of an occupant of the transport, and a shared profile which is shared with the profile of the occupant. In one embodiment, the solutions can also be utilized to store user profile data in a blockchain and intelligently present offers and recommendations to a user based on the user's automatically gathered history of purchases and preferences acquired from the user profile on the blockchain.

Figure 3:
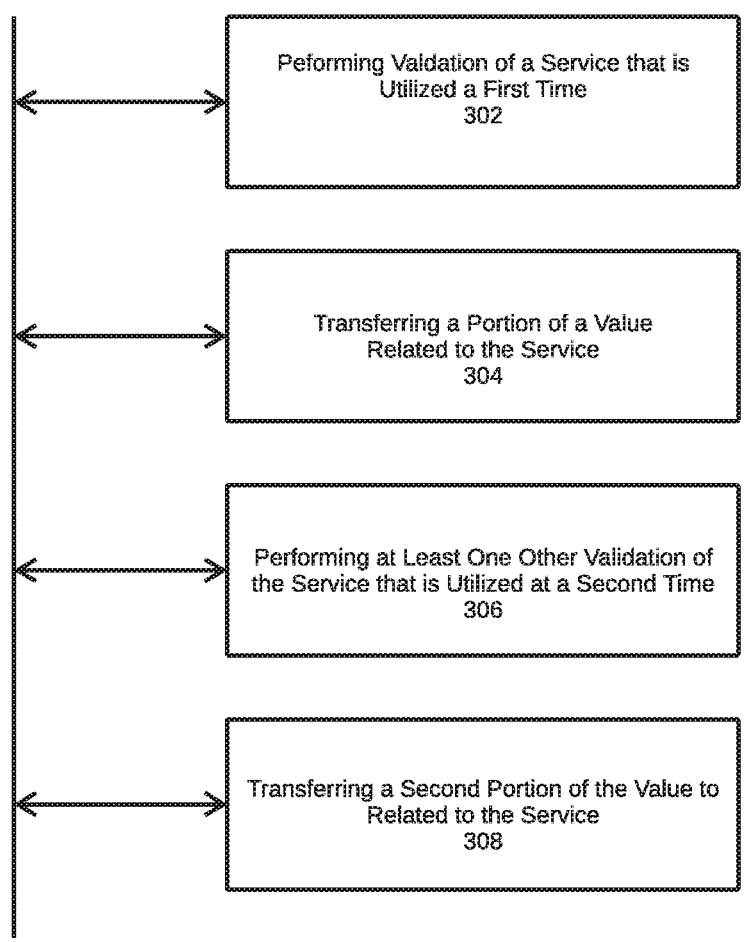
FIG. 3 is a diagram illustrating a method of validating a service performed to a transport, according to example embodiments.

FIG. 3 illustrates a method 300 of validating a service performed to a transport, according to example embodiments. For example, the method 300 may be performed by logic embedded within a computer of a transport. Referring to FIG. 3, in 302, the method may include performing, by a transport, validation of a service that is utilized at a first time. For example, the initial validation may validate that a part was installed, a fluid level was modified, a repair was made, a part has been added, and the like. The transport may include diagnostics, etc., which are generated as a result of the service.

In response to the validation at the first time, in 304 the method may include transferring, by the transport, a portion of a value related to the service. Here, the transport may transfer some portion of a value owed to the entity performing the service, but not all of it. The transport may provide the entity with a digital currency, a credit, a monetary payment, a release of funds in escrow, and the like.

In 306, the method may include performing, by the transport, at least one other validation of the service that is utilized at a second time, wherein the second time is later than the first time. Furthermore, in response to the at least one other validation at the second time, in 308 the method may include transferring, by the transport, a second portion of the value related to the service. The subsequent validation performed in 306 may include validating an operation of the transport after the component has been added to the transport based on sensor readings from sensor devices on the transport. For example, if new tires have been added, initial validation may validate that the tires are new. The subsequent validation may occur while the transport is being driven and the alignment has been monitored for a few miles.

In some embodiments, the method may include receiving operational parameters of the transport that are sensed via one or more sensors of the transport, and performing the validation of the service at the first time based on the received operational parameter in comparison to predefined thresholds for the operational parameters. In some embodiments, the performing the at least one validation may include continuously performing the at least one validation until at least one of a predetermined time elapses and a predetermined distance is traveled. In some embodiments, the method may further include receiving a memory update comprising constraints for validating the service from a remote computing system based on current driving characteristics, and storing the memory update within a memory of the transport.

In some embodiments, the method may further include transmitting a communication from the transport to a remote server of the service which indicates the performance of the validation of the service at the first time, and transmitting a second communication from the transport to the remote server of the service which indicates the performance of the at least one other validation of the service at the second time. In some embodiments, the method may further include establishing a connection with a mobile device of the transport via a wireless channel of the transport, establishing a connection with a remote server of the service via a local area network (LAN) channel of the transport, and transferring the value from the mobile device to the remote server, via the transport.

Figure 4:
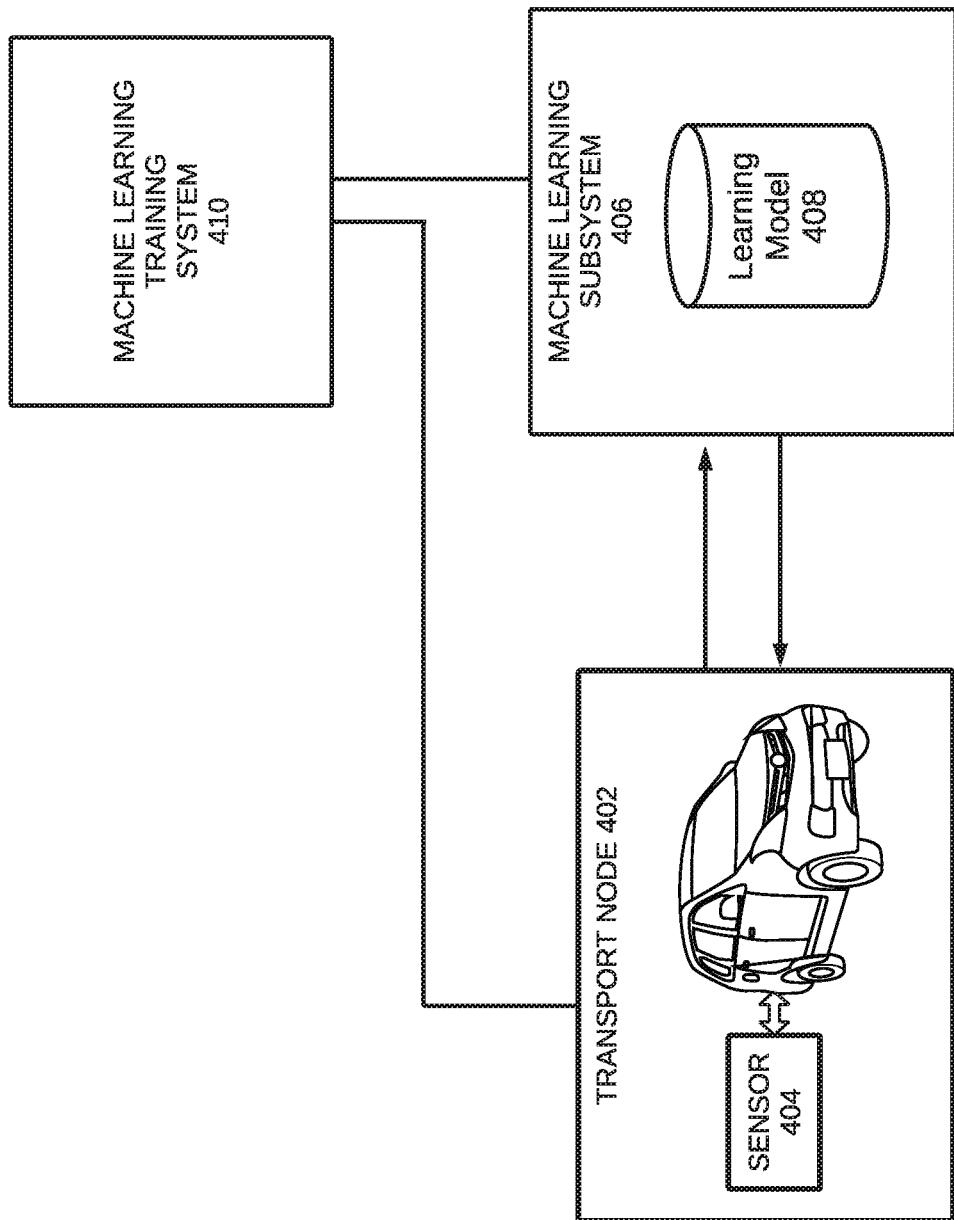
FIG. 4 is a diagram illustrating a machine learning transport network example, according to example embodiments.

FIG. 4 illustrates a machine learning transport network diagram 400, according to example embodiments. The network 400 includes a transport node 402 that interfaces with a machine learning subsystem 406. The transport node includes one or more sensors 404.

The machine learning subsystem 406 contains a learning model 408, which is a mathematical artifact created by a machine learning training system 410 that generates predictions by finding patterns in one or more training data sets. In some embodiments, the machine learning subsystem 406 resides in the transport node 402. In other embodiments, the machine learning subsystem 406 resides outside of the transport node 402.

The transport node 402 sends data from the one or more sensors 404 to the machine learning subsystem 406. The machine learning subsystem 406 provides the one or more sensor 404 data to the learning model 408, which returns one or more predictions. The machine learning subsystem 406 sends one or more instructions to the transport node 402 based on the predictions from the learning model 408.

In a further embodiment, the transport node 402 may send the one or more sensor 404 data to the machine learning training system 410. In yet another embodiment, the machine learning subsystem 406 may sent the sensor 404 data to the machine learning subsystem 410. One or more of the applications, features, steps, solutions, etc., described and/or depicted herein may utilize the machine learning network 400 as described herein.

Figure 5A:
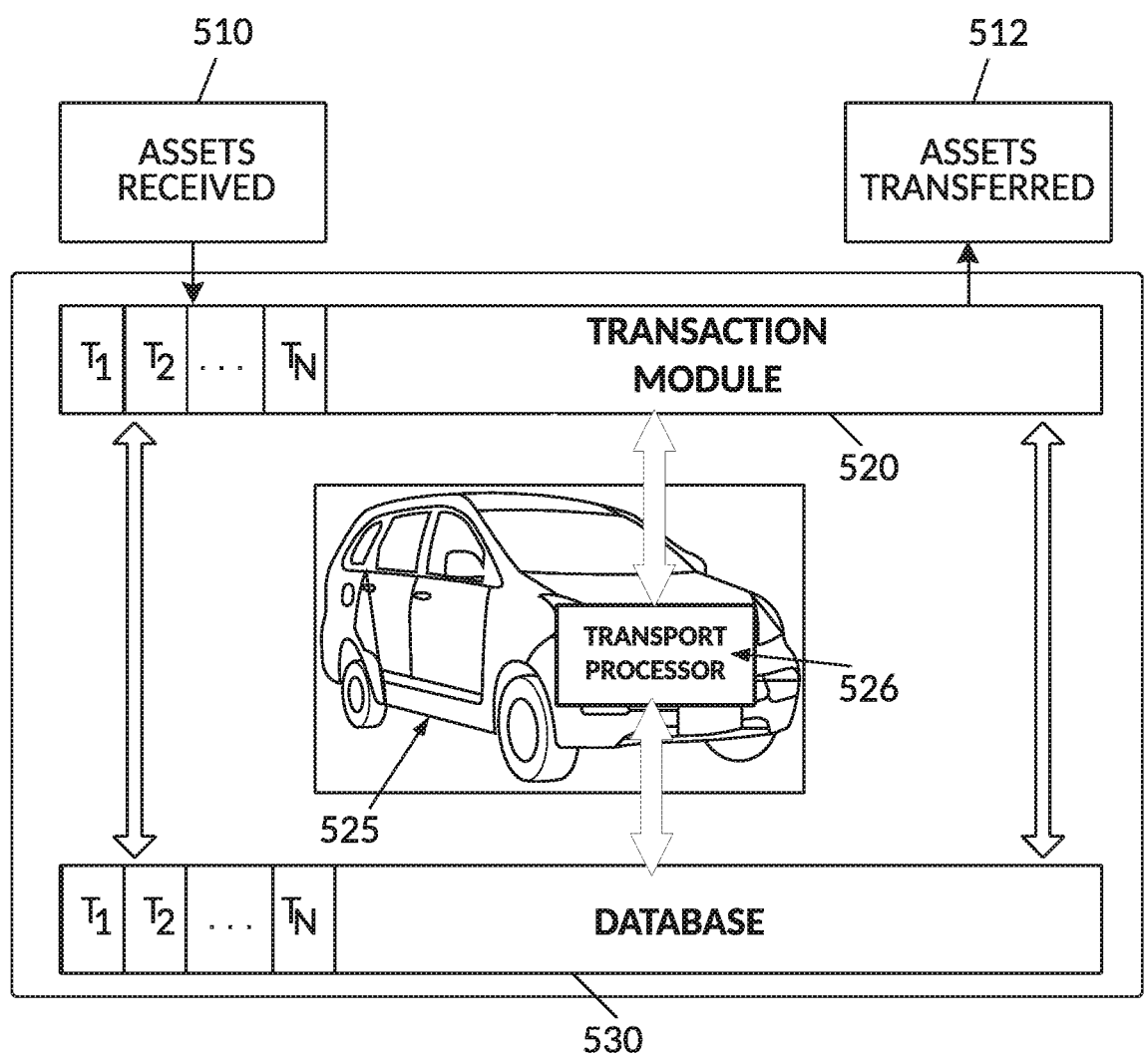
FIG. 5A is a diagram illustrating an example vehicle configuration for managing database transactions associated with a vehicle, according to example embodiments.

FIG. 5A illustrates an example vehicle configuration 500 for managing database transactions associated with a vehicle, according to example embodiments. Referring to FIG. 5A, as a particular transport/vehicle 525 is engaged in transactions (e.g., vehicle service, dealer transactions, delivery/pickup, transportation services, etc.), the vehicle may receive assets 510 and/or expel/transfer assets 512 according to a transaction(s). A transport processor 526 resides in the vehicle 525 and communication exists between the transport processor 526, a database 530, a transport processor 526 and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, an RDBMS, a relational database, a non-relational database, a blockchain, a distributed ledger, and may be on board the transport, may be off board the transport, may be accessible directly and/or through a network, or be accessible to the transport.

Figure 5B:
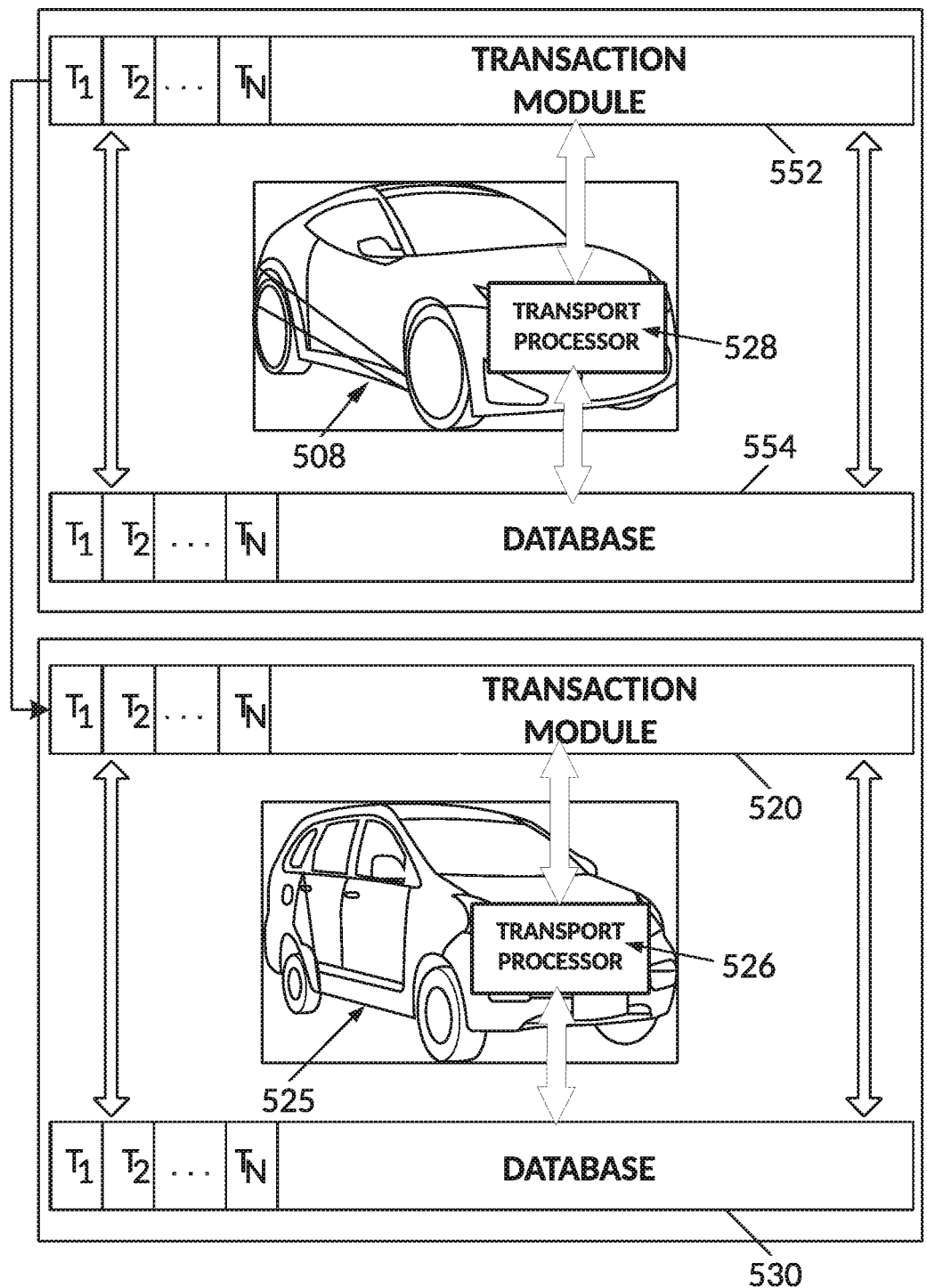
FIG. 5B is a diagram illustrating another example vehicle configuration for managing database transactions conducted among various vehicles, according to example embodiments

FIG. 5B illustrates an example vehicle configuration 550 for managing database transactions conducted among various vehicles, according to example embodiments. The vehicle 525 may engage with another vehicle 508 to perform various actions such as to share, transfer, acquire service calls, etc. when the vehicle has reached a status where the services need to be shared with another vehicle. For example, the vehicle 508 may be due for a battery charge and/or may have an issue with a tire and may be in route to pick up a package for delivery. A transport processor 528 resides in the vehicle 508 and communication exists between the transport processor 528, a database 554, and the transaction module 552. The vehicle 508 may notify another vehicle 525, which is in its network and which operates on its blockchain member service. A transport processor 526 resides in the vehicle 525 and communication exists between the transport processor 526, a database 530, the transport processor 526 and a transaction module 520. The vehicle 525 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 525 and the record of the transferred service is logged in the database 530/554 assuming that the blockchains are different from one another, or, are logged in the same blockchain used by all members. The database 554 can be one of a SQL database, an RDBMS, a relational database, a non-relational database, a blockchain, a distributed ledger, and may be on board the transport, may be off board the transport, may be accessible directly and/or through a network.

Figure 6A:
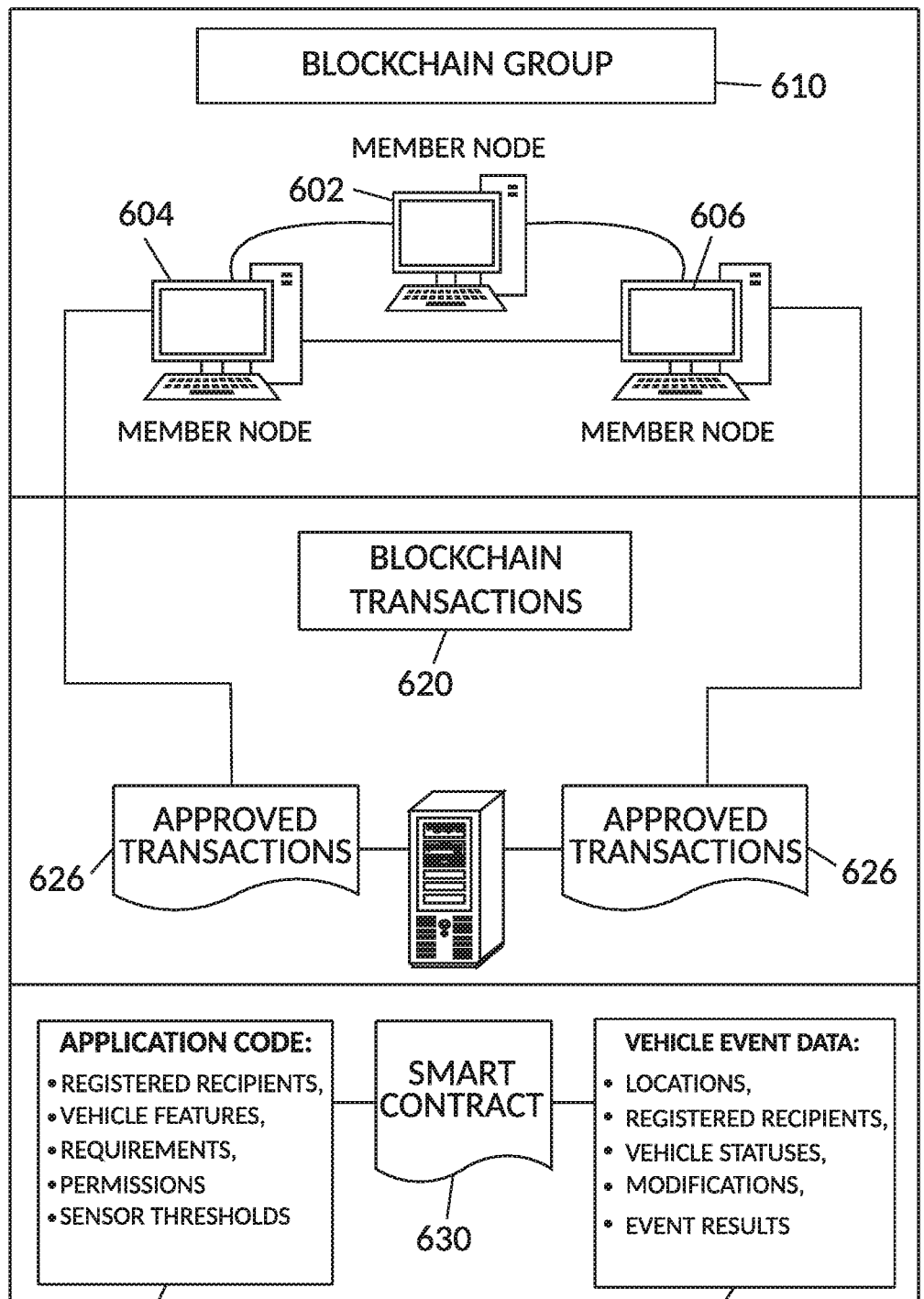
FIG. 6A is a diagram illustrating a blockchain architecture configuration, according to example embodiments.

FIG. 6A illustrates a blockchain architecture configuration 600, according to example embodiments. Referring to FIG. 6A, the blockchain architecture 600 may include certain blockchain elements, for example, a group of blockchain member nodes 602-606 as part of a blockchain group 610. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 620 are stored in memory of computers as the transactions are received and approved by the consensus model dictated by the members' nodes. Approved transactions 626 are stored in current blocks of the blockchain and committed to the blockchain via a committal procedure, which includes performing a hash of the data contents of the transactions in a current block and referencing a previous hash of a previous block. Within the blockchain, one or more smart contracts 630 may exist that define the terms of transaction agreements and actions included in smart contract executable application code 632, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status, which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 634, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 630, which are then stored in a blockchain. For example, sensor thresholds stored in the smart contract can be used as the basis for whether a detected service is necessary and when and where the service should be performed.

Figure 6B:
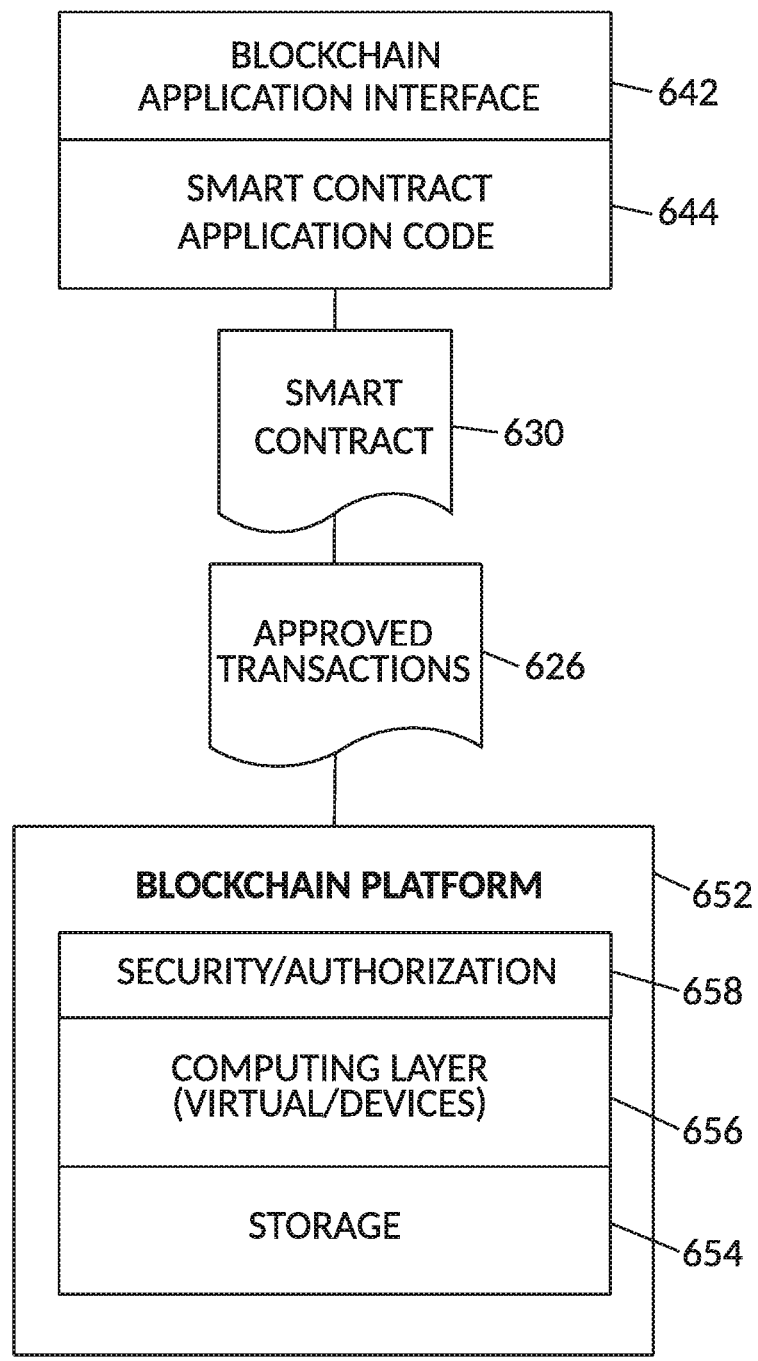
FIG. 6B is a diagram illustrating another blockchain configuration, according to example embodiments.

FIG. 6B illustrates a shared ledger configuration, according to example embodiments. Referring to FIG. 6B, the blockchain logic example 640 includes a blockchain application interface 642 as an API or plug-in application that links to the computing device and execution platform for a particular transaction. The blockchain configuration 640 may include one or more applications, which are linked to application programming interfaces (APIs) to access and execute stored program/application code (e.g., smart contract executable code, smart contracts, etc.), which can be created according to a customized configuration sought by participants and can maintain their own state, control their own assets, and receive external information. This can be deployed as an entry and installed, via appending to the distributed ledger, on all blockchain nodes.

The smart contract application code 644 provides a basis for the blockchain transactions by establishing application code, which when executed causes the transaction terms and conditions to become active. The smart contract 630, when executed, causes certain approved transactions 626 to be generated, which are then forwarded to the blockchain platform 652. The platform includes a security/authorization 658, computing devices, which execute the transaction management 656 and a storage portion 654 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors, which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 6A and 6B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code that is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 6C:
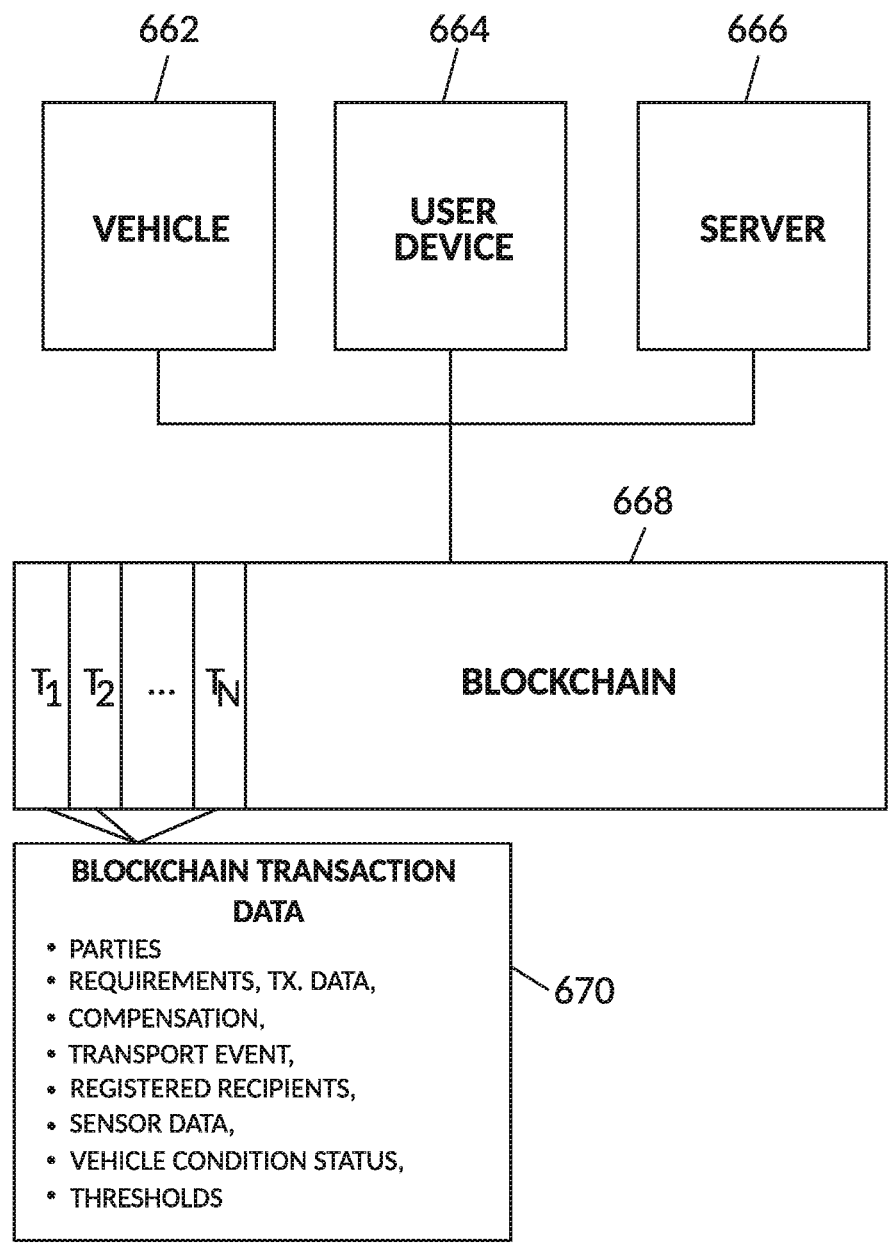
FIG. 6C is a diagram illustrating a blockchain configuration for storing blockchain transaction data, according to example embodiments.

FIG. 6C illustrates a blockchain configuration for storing blockchain transaction data, according to example embodiments. Referring to FIG. 6C, the example configuration 660 provides for the vehicle 662, the user device 664 and a server 666 sharing information with a distributed ledger (i.e., blockchain) 668. The server may represent a service provider entity inquiring with a vehicle service provider to share user profile rating information in the event that a known and established user profile is attempting to rent a vehicle with an established rated profile. The server 666 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 670 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 6D:
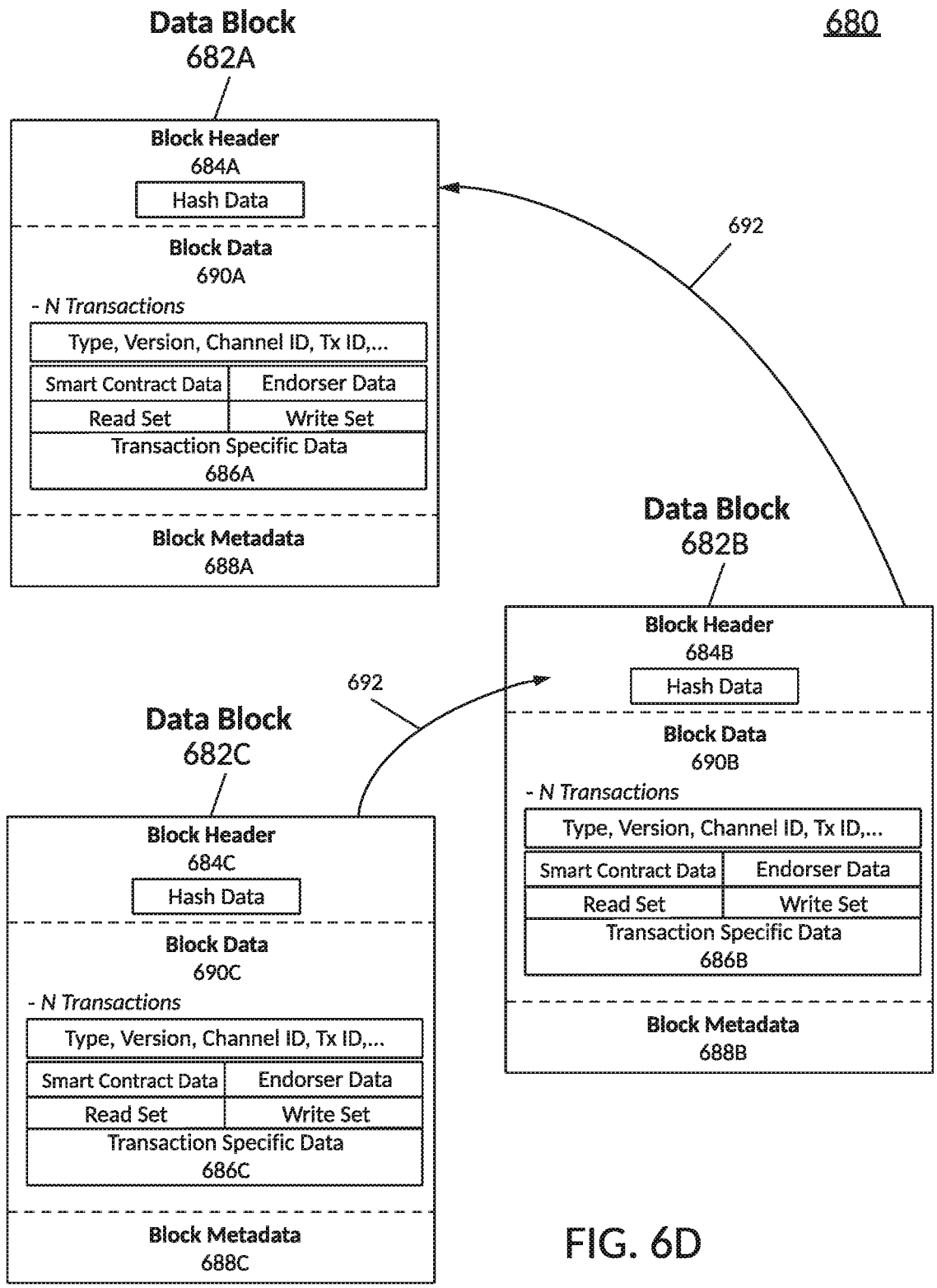
FIG. 6D is a diagram illustrating example data blocks, according to example embodiments.

FIG. 6D illustrates blockchain blocks 680 that can be added to a distributed ledger, according to example embodiments, and contents of block structures 682A to 682n. Referring to FIG. 6D, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain that stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts, which simulate the entry proposals. When an endorsing node endorses an entry, the endorsing nodes creates an entry endorsement, which is a signed response from the endorsing node to the client application indicating the endorsement of the simulated entry. The method of endorsing an entry depends on an endorsement policy that may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 682A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6D, a block 682A (also referred to as a data block) that is stored on the blockchain and/or the distributed ledger may include multiple data segments such as a block header 684A to 684*n*, transaction specific data 686A to 686*n*, and block metadata 688A to 688*n*. It should be appreciated that the various depicted blocks and their contents, such as block 682A and its contents are merely for purposes of an example and are not meant to limit the scope of the example embodiments. In some cases, both the block header 684A and the block metadata 688A may be smaller than the transaction specific data 686A, which stores entry data; however, this is not a requirement. The block 682A may store transactional information of N entries (e.g., 100, 500, 1000, 2000, 3000, etc.) within the block data 690A to 690*n*. The block 682A may also include a link to a previous block (e.g., on the blockchain) within the block header 684A. In particular, the block header 684A may include a hash of a previous block's header. The block header 684A may also include a unique block number, a hash of the block data 690A of the current block 682A, and the like. The block number of the block 682A may be unique and assigned in an incremental/sequential order starting from zero. The first block in the blockchain may be referred to as a genesis block, which includes information about the blockchain, its members, the data stored therein, etc.

The block data 690A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 690A may also store transaction specific data 686A, which adds additional information to the hash-linked chain of blocks in the blockchain. Accordingly, the data 686A can be stored in an immutable log of blocks on the distributed ledger. Some of the benefits of storing such data 686A are reflected in the various embodiments disclosed and depicted herein. The block metadata 688A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 610A and a validation code identifying whether an entry was valid/invalid.

The other blocks 682B to 682*n* in the blockchain also have headers, files, and values. However, unlike the first block 682A, each of the headers 684A to 684*n* in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 692, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
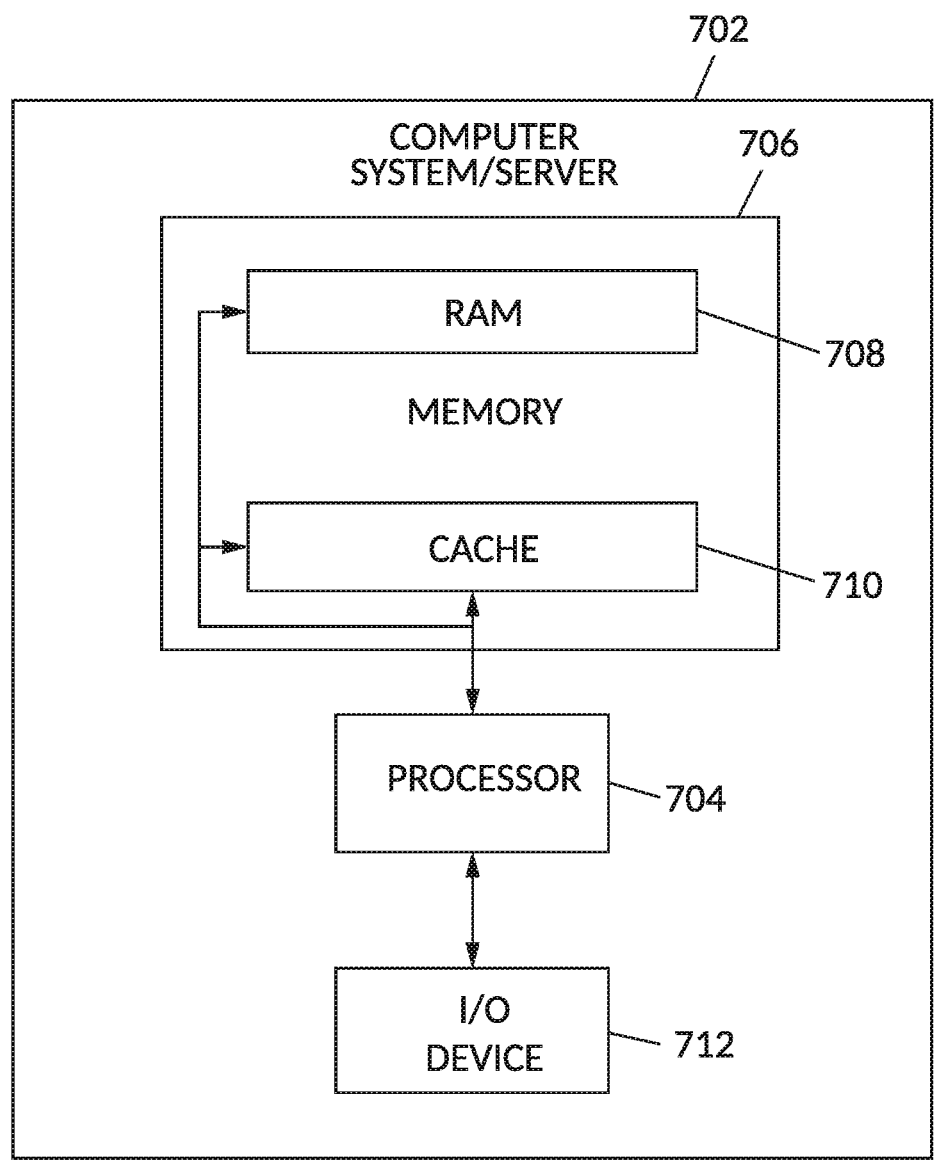
FIG. 7 is a diagram illustrating an example system that supports one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 708 and/or cache memory 710. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via an I/O device 712 (such as an I/O adapter), which may include a keyboard, a pointing device, a display, a voice recognition module, etc., one or more devices that enable a user to interact with computer system/server 702, and/or any devices (e.g., network card, modem, etc.) that enable computer system/server 702 to communicate with one or more other computing devices. Such communication can occur via I/O interfaces of the device 712. Still yet, computer system/server 702 can communicate with one or more networks such as a local area network (LAN), a general wide area network (WAN), and/or a public network (e.g., the Internet) via a network adapter. As depicted, device 712 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations that when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
powering on a transport that is powered off;
receiving sensor data from one or more hardware sensors installed on the transport after the transport is powered on and not moving via a hardware bus coupled to the computer installed in the transport;
determining that a new component was added to the transport while the transport was powered off based on the received sensor data;
initially validating the new component based on parameter levels associated with the new component included in the received sensor data while the transport is not moving;
receiving additional sensor data from one or more hardware sensors installed on the transport while the transport is powered on and moving via the hardware bus coupled to the computer installed in the transport;
further validating the new component again based on additional parameter levels associated with the new component included in the additional sensor data received while the transport is moving;
determining that the further validating is not successful; and in response to the determination that the further validating is not successful, identifying and communicating remaining issues with the new component to a remote server.

2. The method of claim 1, wherein the further validating further comprises validating an operation of the transport after the new component has been added to the transport based on sensor readings from one or more hardware sensors installed on the transport.

3. The method of claim 1, wherein the initially validating further comprises validating the new component based on the parameter levels in comparison to predefined thresholds for the parameter levels.

4. The method of claim 1, wherein the method further comprises continuously performing validations of the new component until at least one of a predetermined time elapses and a predetermined distance is traveled.

5. The method of claim 1, further comprising receiving a memory update comprising constraints for validating the new component from flan the remote server based on current driving characteristics, and storing the memory update within a memory of the transport.

6. The method of claim 1, further comprising transmitting a communication from the transport to the remote server which indicates a successful validation of the new component at the first time, and transmitting a second communication from the transport to the remote server of the new service which indicates an unsuccessful validation of the new component at the subsequent time.

7. The method of claim 1, further comprising establishing a connection with a mobile device of the transport via a wireless channel of the transport, establishing a connection with the remote server of the new service via a local area network (LAN) channel of the transport, and transferring the value from the mobile device to the remote server, via the transport.

8. A transport comprising:
a processor configured to:
    receive sensor data from one or more hardware sensors installed on the transport after the transport is powered on and not moving via a hardware bus coupled to the computer installed in the transport;
    determine that a new component was added to the transport while the transport was powered off based on the received sensor data;
    initially validate the new component based on parameter levels associated with the new component included in the received sensor while the transport is not moving;
    receive additional sensor data from the one or more hardware sensors installed on the transport while the transport is powered on and moving via the hardware bus coupled to the computer installed in the transport;
    further validate the new component again based on additional parameter levels associated with the new component included in the additional sensor data receive while the transport is moving; and
    in response to the determination that the further validating is not successful, identify and communicate remaining issues with the new component to a remote server.

9. The transport of claim 8, wherein the processor is configured to further validate an operation of the transport after the new component has been added to the transport based on sensor readings from one or more sensors on the transport at the second time.

10. The transport of claim 8, wherein the processor is configured to initially validate the new component based on the parameter levels in comparison to predefined thresholds for the parameter levels.

11. The transport of claim 8, wherein the processor is further configured to continuously validate the new component until at least one of a predetermined time elapses and a predetermined distance is traveled.

12. The transport of claim 8, wherein the processor is configured to receive a memory update that comprises constraints to validate the new component from the remote server based on current driving characteristics, and store the memory update within a memory of the transport.

13. The transport of claim 8, wherein the processor is configured to transmit a communication from the transport to the remote server which indicates a successful validation of the new component at the first time, and transmit a second communication from the transport to the remote server which indicates an unsuccessful validation of the new component at the subsequent time.

14. The transport of claim 8, wherein the processor is configured to establish a connection with a mobile device of the transport via a Wireless channel of the transport, establish a connection with the remote server of the new service via a local area network (LAN) channel of the transport, and transfer the value from the mobile device to the remote server, via the transport.

15. A non-transitory computer-readable medium comprising instructions, that when read by a processor, cause the processor to perform:
    receiving sensor data from one or more hardware sensors installed on the transport after the transport is powered on and not moving via a hardware bus coupled to the computer installed in the transport;
    determining that a new component was added to the transport while the transport was powered off based on the received sensor data;
    initially validating the new component based on parameter levels associated with the new component included in the received sensor data while the transport is not moving;
    receiving additional sensor data from one or more hardware sensors installed on the transport while the transport is powered on and moving via the hardware bus coupled to the computer installed in the transport;
    further validating the new component again based on additional parameter levels associated with the new component included in the additional sensor data received while the transport is moving;
    determining that the further validating is not successful; and
    in response to the determination that the further validating is not successful, identifying and communicating remaining issues with the new component to a remote server.

16. The non-transitory computer-readable medium of claim 15, wherein the further validating further comprises validating an operation of the transport after the new component has been added to the transport based on sensor readings from one or more hardware sensors installed on the transport.

17. The non-transitory computer-readable medium of claim 15, wherein the initially validating further comprises validating the new component based on the parameter levels in comparison to predefined thresholds for the parameter levels.

18. The non-transitory computer-readable medium of claim 15, wherein the method further comprises continuously validating the new component until at least one of a predetermined time elapses and a predetermined distance is traveled.

19. The non-transitory computer-readable medium of claim 15, wherein the method further comprises receiving a memory update comprising constraints for validating the new component from the remote server based on current driving characteristics, and storing the memory update within a memory of the transport.

20. The non-transitory computer-readable medium of claim 15, wherein the method further comprises transmitting a communication from the transport to the remote server which indicates a successful validation of the new component at the first time, and transmitting a second communication from the transport to the remote server of the service which indicates an unsuccessful validation of the new component at the subsequent time.

* * * * *